(12) United States Patent
Watanabe et al.

(10) Patent No.: US 10,788,742 B2
(45) Date of Patent: Sep. 29, 2020

(54) DISPLAY SYSTEM

(71) Applicant: NEC CORPORATION, Tokyo (JP)

(72) Inventors: Go Watanabe, Tokyo (JP); Fujio Okumura, Kanagawa (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/334,840

(22) PCT Filed: Sep. 15, 2017

(86) PCT No.: PCT/JP2017/033412
§ 371 (c)(1),
(2) Date: Mar. 20, 2019

(87) PCT Pub. No.: WO2018/056196
PCT Pub. Date: Mar. 29, 2018

(65) Prior Publication Data
US 2020/0019050 A1    Jan. 16, 2020

(30) Foreign Application Priority Data

Sep. 21, 2016  (JP) ................................ 2016-184073

(51) Int. Cl.
*H04N 9/31* (2006.01)
*G03B 21/28* (2006.01)
(Continued)

(52) U.S. Cl.
CPC ......... *G03B 21/28* (2013.01); *G02B 26/0816* (2013.01); *G03B 21/005* (2013.01);
(Continued)

(58) Field of Classification Search
CPC .. H04N 9/3102; H04N 9/3155; H04N 9/3185; G03B 21/28; G03B 21/005; G02B 26/0816
(Continued)

(56) References Cited

U.S. PATENT DOCUMENTS 5,285,287 A  *  2/1994  Shikama .............. H04N 9/3141
                                                  348/745
2006/0092338 A1*  5/2006  Sakai .................. H04N 5/7408
                                                  348/744
(Continued)

FOREIGN PATENT DOCUMENTS

JP        4-136326 A      5/1992
JP        8-062721 A      3/1996
(Continued)

OTHER PUBLICATIONS

Communication dated Nov. 5, 2019, from the Japanese Patent Office in counterpart application No. 2018-541032.
(Continued)

*Primary Examiner* — Michael Lee
(74) *Attorney, Agent, or Firm* — Sughrue Mion, PLLC

(57) ABSTRACT

To display easily-seen display information on any display area regardless of an installation location, a display system (1) includes: a projection device (10) that switches and projects emitted light from a spatial light modulator element onto a plurality of display areas; and a control device (20) that controls the projection device to switch a projection direction of projected light from the projection device (10), based on a display condition of display information to be displayed on the display areas. The projection device (10) has: a reflecting mirror that is put in and out of a light path of emitted light from the spatial light modulator element; and a light path switching means that switches the projection direction of projected light by putting the reflecting mirror in
(Continued)

and out of the light path of emitted light from the spatial light modulator element in response to control of the control device.

14 Claims, 31 Drawing Sheets

(51) Int. Cl.
  *G02B 26/08* (2006.01)
  *G03B 21/00* (2006.01)
(52) U.S. Cl.
  CPC ......... *H04N 9/3102* (2013.01); *H04N 9/3155* (2013.01); *H04N 9/3185* (2013.01)
(58) Field of Classification Search
  USPC ........................................................ 348/747
  See application file for complete search history.

(56) References Cited

U.S. PATENT DOCUMENTS

| | | | | |
|---|---|---|---|---|
| 2007/0097320 | A1* | 5/2007 | Ullmann | G03B 21/28 353/30 |
| 2012/0120374 | A1* | 5/2012 | Keh | G03B 21/28 353/85 |

FOREIGN PATENT DOCUMENTS

| | | |
|---|---|---|
| JP | 9-274253 A | 10/1997 |
| JP | 2001-305651 A | 11/2001 |
| JP | 2002-090879 A | 3/2002 |
| JP | 2005-012174 A | 1/2005 |
| JP | 2006-322955 A | 11/2006 |
| JP | 2006-527415 A | 11/2006 |
| JP | 2007-011870 A | 1/2007 |
| JP | 2008-089686 A | 4/2008 |
| JP | 2008-197386 A | 8/2008 |
| JP | 2009-046932 A | 3/2009 |
| JP | 2009-110493 A | 5/2009 |
| JP | 2009-180967 A | 8/2009 |
| JP | 2011-150160 A | 8/2011 |
| JP | 2015-031932 A | 2/2015 |
| JP | 2015-105999 A | 6/2015 |
| WO | 2005/083508 A1 | 9/2005 |
| WO | 2010/044204 A1 | 4/2010 |
| WO | 2016/129279 A1 | 8/2016 |
| WO | 2016/129280 A1 | 8/2016 |

OTHER PUBLICATIONS

International Search Report for PCT/JP2017/033412 dated Dec. 5, 2017 [PCT/ISA/210].
Written Opinion for PCT/JP2017/033412 dated Dec. 5, 2017 [PCT/ISA/237].

\* cited by examiner

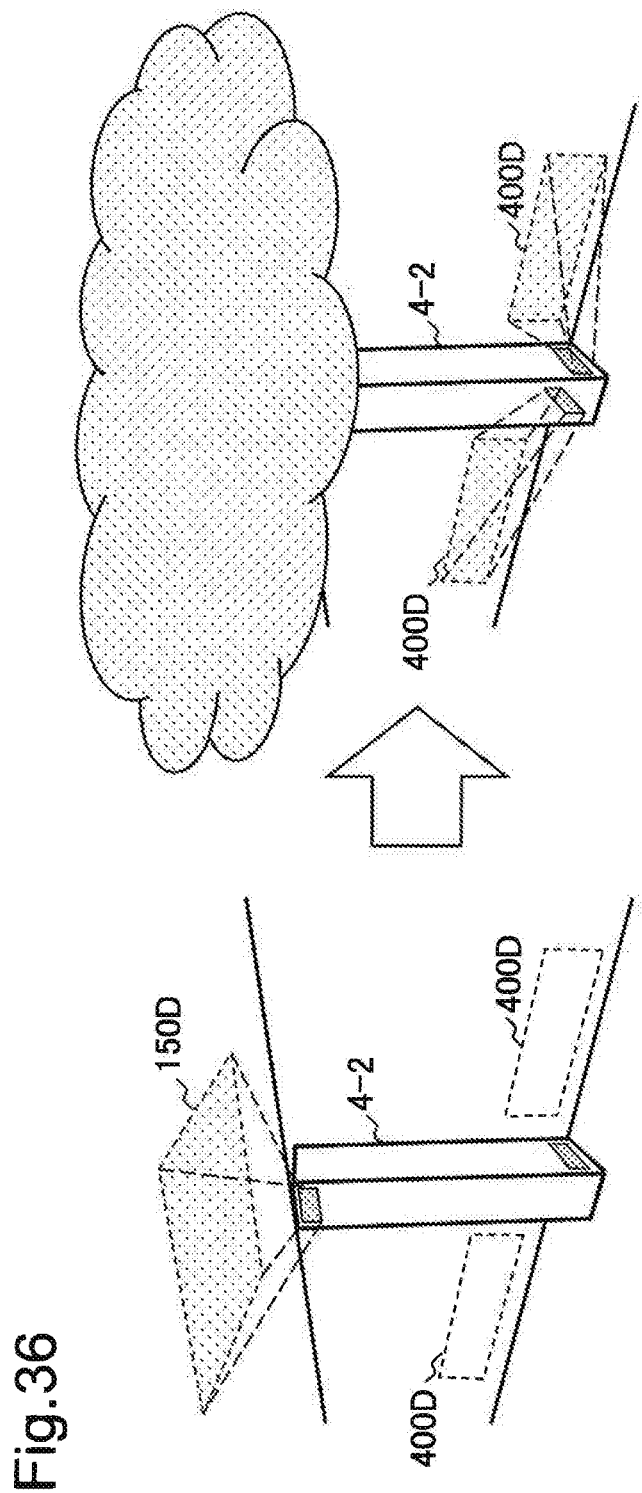

DISPLAY SYSTEM

CROSS REFERENCE TO RELATED APPLICATIONS

This application is a National Stage of International Application No. PCT/JP2017/033412, filed on Sep. 15, 2017, which claims priority from Japanese Patent Application No. 2016-184073, filed on Sep. 21, 2016, the contents of all of which are incorporated herein by reference in their entirety.

TECHNICAL FIELD

The present invention relates to a display system for displaying display information by projected light.

BACKGROUND ART

In a public facility such as a hotel or a hall, for a user using the facility, projecting and displaying display information onto a ceiling, a wall, or the like by a projector improves convenience. For example, when display information is projected onto a passage of a facility or upward in a room, the display information is easily seen by a user.

However, since a person on a wheelchair or a child often sees below, it is not always desirable to project display information upward for them. Further, when a passage or an upper portion of a room is filled with smoke by a fire or the like, display information projected upward may be visually unrecognized due to smoke. In other words, projecting display information downward may be desired.

PTL 1 discloses a projection-type guidance device for designating a guiding direction by using laser light. The device in PTL 1 includes a light source for emitting a light beam, and a light driving unit for causing the light beam to periodically swing in a projection direction. The light driving unit swings a light beam in response to a drive signal including a first alternate-current signal of a first amplitude at a first frequency, and a second alternate-current signal of a second amplitude larger than the first amplitude at a second frequency lower than the first frequency. In the device in PTL 1, it is possible to display a guiding direction by projecting a light beam whose exit angle periodically changes, onto a projection surface.

CITATION LIST

Patent Literature

[PTL 1] Japanese Unexamined Patent Application Publication No. 2007-11870

SUMMARY OF INVENTION

Technical Problem

In the device in PTL 1, it is possible to display display information in motion on a projection surface. However, the device in PTL 1 includes a problem that it is not possible to display display information of a sufficient size since a scanning area that defines a size of display information is limited by a swing range of a torsion hinge.

Further, the device in PTL 1 is needed to be disposed near a floor surface when laser light is projected onto the floor surface, and is needed to be disposed near a ceiling when laser light is projected onto the ceiling. When laser light is projected from a ceiling onto a floor surface, or from a floor surface onto a ceiling, the laser light may directly radiate a user. Thus, there is a problem that it is necessary to change an installation location of the device in PTL 1 depending on a projection surface.

In order to solve the above-described problems, an object of the present invention is to provide a display system that enables to display easily-seen display information toward any display area, without selecting an installation location.

Solution to Problem

A display system according to the present invention includes: a projection device that switches and projects emitted light from a spatial light modulator element onto a plurality of display areas; and a control device that controls the projection device to switch a projection direction of projected light, based on a display condition of display information to be displayed on the plurality of display areas. The projection device includes a reflecting mirror that is put in and out of a light path of emitted light from the spatial light modulator element, and a light path switching means that switches a projection direction of projected light by putting the reflecting mirror in and out of a light path of emitted light from the spatial light modulator element in response to control of the control device.

Advantageous Effects of Invention

According to the present invention, it is possible to provide a display system that enables to display easily-seen display information toward any display area, without selecting an installation location.

BRIEF DESCRIPTION OF DRAWINGS

FIG. 36 is a conceptual diagram illustrating an example of a use scene of a display system according to an example embodiment of the present invention.

EXAMPLE EMBODIMENT

In the following, example embodiments for achieving the present invention are described using the drawings. Below-described example embodiments include technically preferred limitations for implementing the present invention. The scope of the invention, however, is not limited to the following. Note that, in all drawings for use in describing the following example embodiments, unless there is particularly a reason, similar elements are indicated with same reference numbers. Further, in the following example embodiments, repeated description on a similar configuration/operation may be omitted.

First Example Embodiment

First, a display system according to a first example embodiment of the present invention is described with reference to the drawings.

Figure 1:
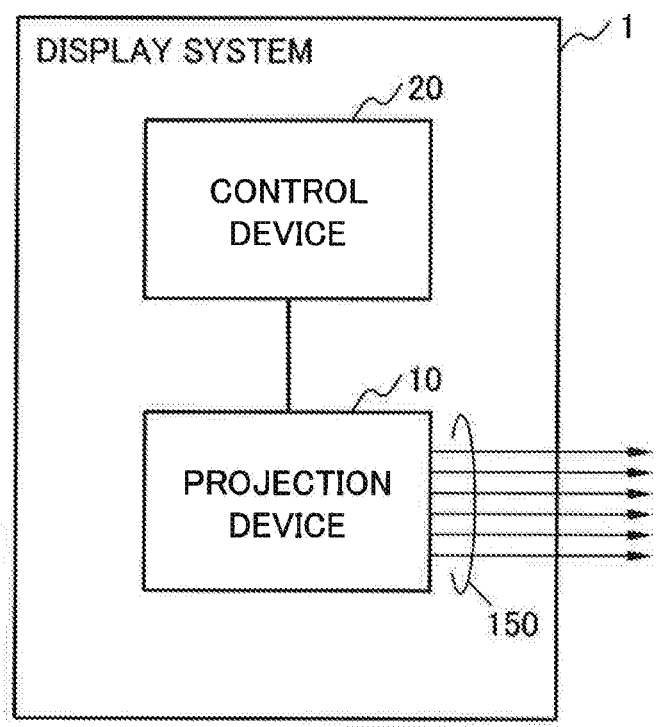
FIG. 1 is a conceptual diagram illustrating a configuration of a display system according to a first example embodiment of the present invention.
Figure 2:
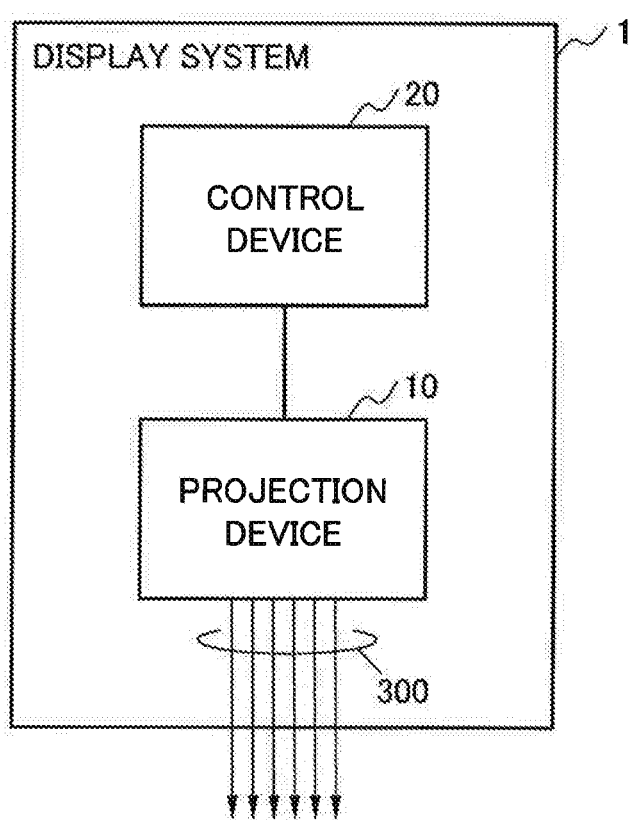
FIG. 2 is a conceptual diagram illustrating another state of the configuration of the display system according to the first example embodiment of the present invention.

FIG. 1 is a conceptual diagram illustrating a configuration of a display system 1 in the present example embodiment. Further, FIG. 2 is a conceptual diagram illustrating another state of the configuration of the display system 1 in the present example embodiment. The display system 1 includes a projection device 10 and a control device 20.

As illustrated in FIG. 1, the projection device 10 projects projected light 150 for displaying on a first display area in response to control of the control device 20. Projected light 150 projected from the projection device 10 is displayed on the first display area as display information. The first display area is a screen where projected light 150 projected from the projection device 10 is displayed as display information.

Further, as illustrated in FIG. 2, the projection device 10 projects projected light 300 for displaying on a second display area in response to control of the control device 20. Projected light 300 projected from the projection device 10 is displayed on the second display area as display information. The second display area is a screen where projected light 300 projected from the projection device 10 is displayed as display information.

The control device 20 emits projected light 150 or projected light 300 by controlling the projection device 10. The control device 20 projects projected light 150 for displaying on the first display area by controlling the projection device 10. Further, the control device 20 projects projected light 300 for displaying on the second display area by controlling the projection device 10.

For example, the control device 20 receives a switching signal from an unillustrated host system, and switches a projection direction of light to be projected from the projection device 10 in response to the switching signal. When receiving the switching signal during a period when projected light 150 is projected onto the first display area, the control device 20 switches in such a way that projected light 300 is projected onto the second display area. Further, when receiving the switching signal during a period when projected light 300 is projected onto the second display area, the control device 20 switches in such a way that projected light 150 is projected onto the first display area. Note that, when the control device 20 is able to generate the switching signal, the control device 20 may switch a projection direction of light to be projected from the projection device 10 in response to the switching signal generated by the own device.

Subsequently, each constituent element of the display system 1 in the present example embodiment is described in detail.

[Projection Device]

Figure 3:
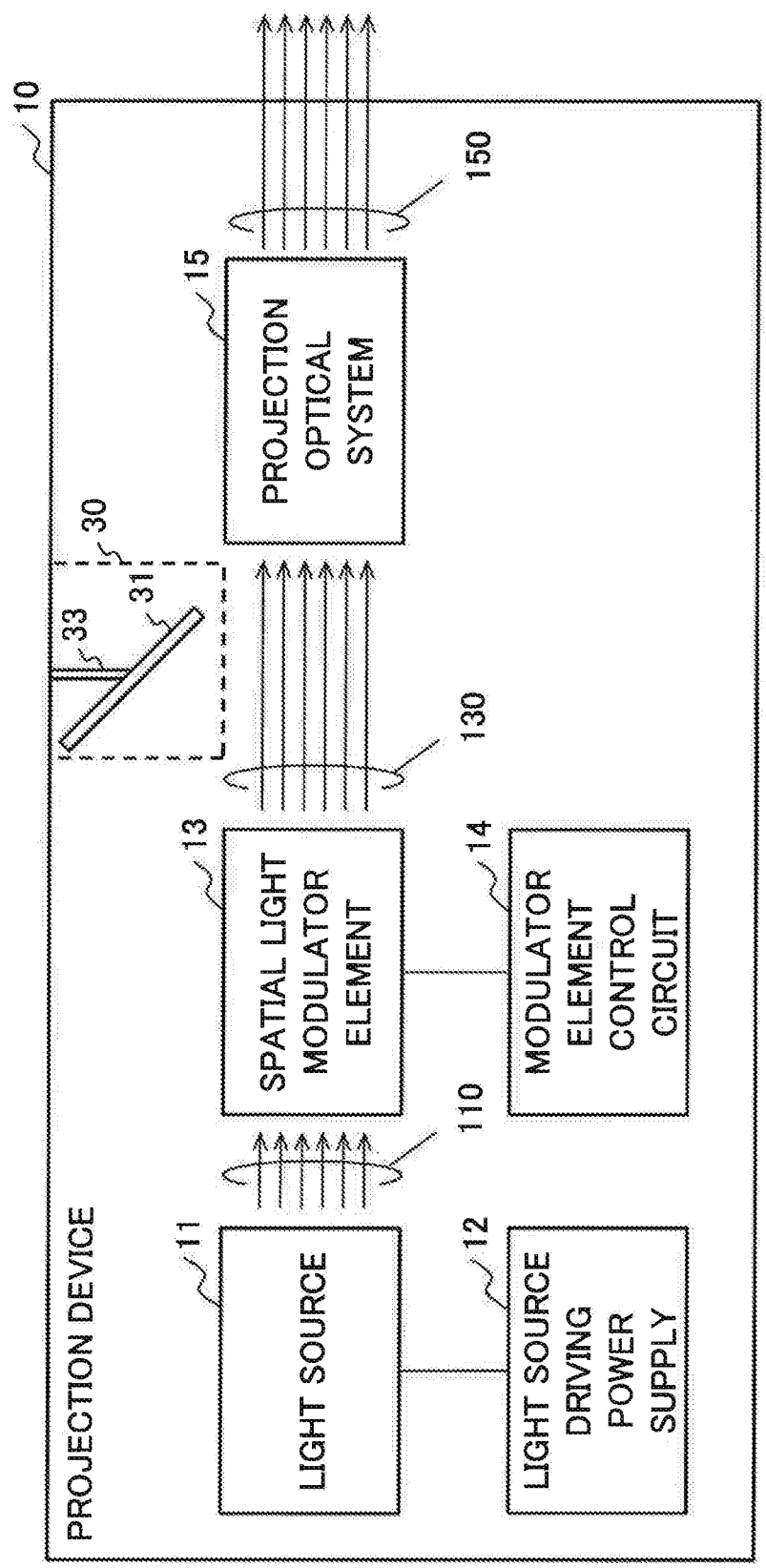
FIG. 3 is a conceptual diagram illustrating a configuration of a projection device of the display system according to the first example embodiment of the present invention.
Figure 4:
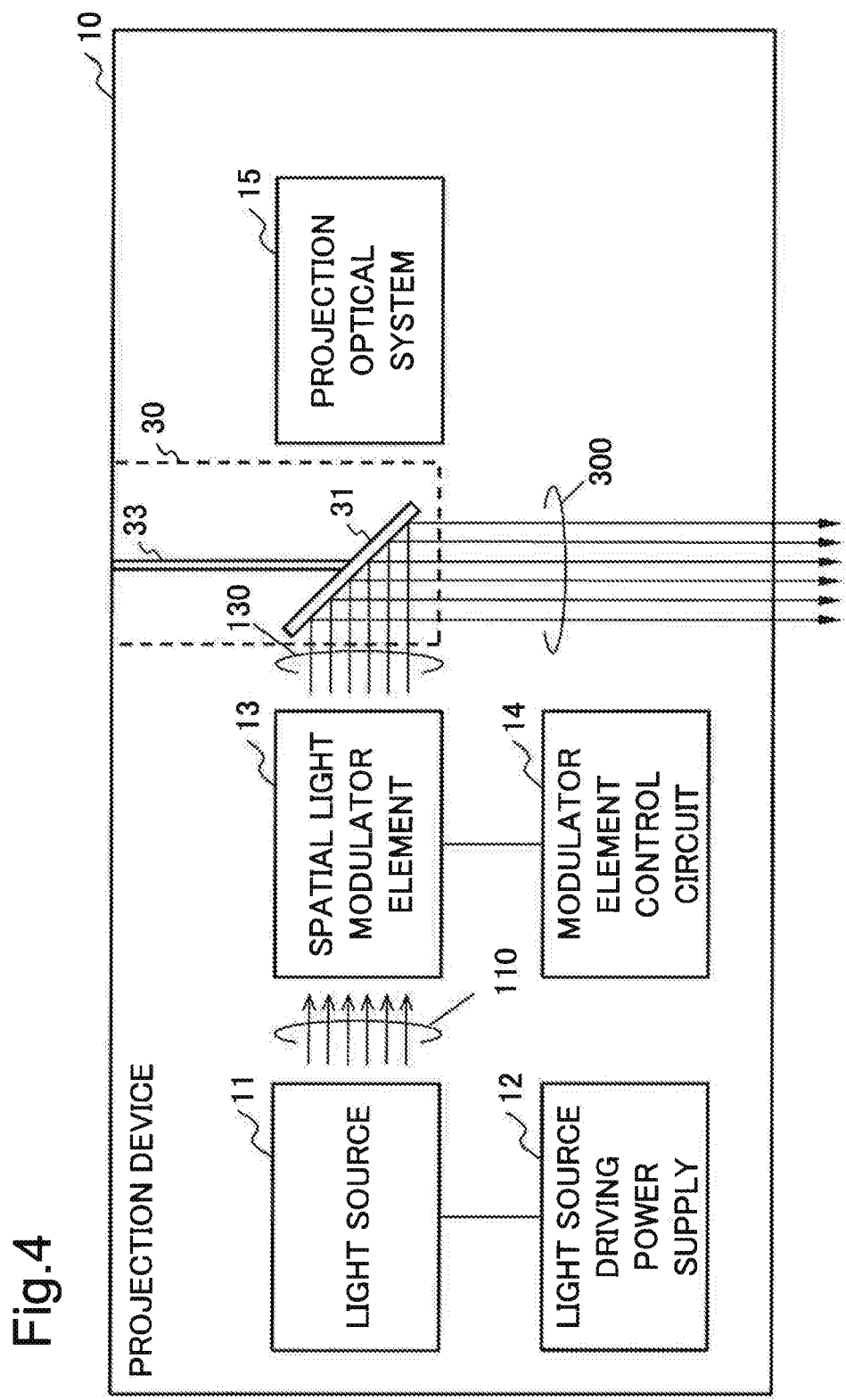
FIG. 4 is a conceptual diagram illustrating another state relating to the configuration of the projection device of the display system according to the first example embodiment of the present invention.

FIG. 3 is a conceptual diagram illustrating a configuration of the projection device 10 of the display system 1. FIG. 4 is a conceptual diagram illustrating another state of the configuration of the projection device 10 of the display system 1.

As illustrated in FIG. 3, the projection device 10 includes a light source 11, a light source driving power supply 12, a spatial light modulator element 13, a modulator element control circuit 14, a projection optical system 15, and a light path switching means 30. The light path switching means 30 includes a reflecting mirror 31 and a movable part 33. Note that FIG. 3 is a conceptual diagram, and does not accurately illustrate a positional relationship among constituent elements, a radiation direction of light, and the like.

The light source 11 emits light 110 of a specific wavelength. For example, a laser light source may be employed as the light source 11. Light 110 to be emitted from the light source 11 is preferably coherent light in which phases are aligned. Generally, the light source 11 is configured to emit light in a visible light region. Note that the light source 11 may be configured to emit light in a range other than the visible light region, such as an infrared light region or an ultraviolet light region. Further, the light source 11 may be a light emitting device other than a laser light source, such as a light emitting diode, an incandescent light bulb, and a discharge tube.

For example, configuring the light source 11 in such a way that light of a plurality of wavelengths is emitted enables to change a color of display information by changing a wavelength of light to be emitted from the light source 11. Further, configuring the light source 11 in such a way that light of different wavelengths is simultaneously emitted enables to display display information composed of a plurality of colors.

The light source driving power supply 12 is a power supply for causing the light source 11 to emit light 110 by driving the light source 11 in response to control of the control device 20.

The spatial light modulator element 13 displays a pattern for generating display information to be displayed on each display area on a display part of the own device in response to control of the modulator element control circuit 14. In the present example embodiment, light 110 is radiated onto the display part of the spatial light modulator element 13 in a state that a predetermined pattern is displayed on the display part. The spatial light modulator element 13 emits modulated light 130 acquired by modulating light 110 toward the projection optical system 15.

The spatial light modulator element 13 is implemented by a phase-modulation-type spatial light modulator element which receives incidence of coherent light 110 in which phases are aligned, and modulates a phase of the incident light 110. Since the phase-modulation-type spatial light modulator element 13 is focus-free, it is not necessary to change a focal point for each distance, even when light is projected onto a display area set at a plurality of projection distances. Note that, as far as it is possible to display display information on each display area, the spatial light modulator element 13 may be an element of a type different from a phase modulation type. In the following, however, description is made based on a premise that the spatial light modulator element 13 is an element of a phase modulation type.

A phase distribution of display information to be displayed on each display area is displayed on a display part of the phase-modulation-type spatial light modulator element 13. In this case, modulated light 130 reflected on the display part of the spatial light modulator element 13 becomes an image such that a sort of diffraction grating forms an aggregation, and display information is formed in such a way that light diffracted by a diffraction grating is collected.

The spatial light modulator element 13 is implemented by a spatial light modulator element employing a ferroelectric liquid crystal, a homogeneous liquid crystal, a vertical orientation liquid crystal, or the like, for example. Specifically, the spatial light modulator element 13 is implementable by a liquid crystal on silicon (LCOS). Further, the spatial light modulator element 13 may be implemented by a micro electro mechanical system (MEMS), for example.

Employing the phase-modulation-type spatial light modulator element 13 enables to concentrate energy at a portion of display information by operating the spatial light modulator element 13 to successively switch a display area to be projected with projected light. Therefore, a phase-modulation-type spatial light modulator element is able to display display information brightly as compared with another method, as far as an output of a light source is the same.

The modulator element control circuit 14 causes a display part of the spatial light modulator element 13 to display a pattern for generating display information to be displayed on each display area in response to control of the control device 20. When a phase-modulation-type modulator element is driven, the modulator element control circuit 14 drives the spatial light modulator element 13 in such a way that a parameter that determines a difference between a phase of light 110 to be radiated onto a display part of the spatial light modulator element 13, and a phase of modulated light 130 to be reflected on the display part changes.

A parameter that determines a difference between a phase of light 110 to be radiated onto a display part of the phase-modulation-type spatial light modulator element 13, and a phase of modulated light 130 to be reflected on the display part is, for example, a parameter relating to an optical characteristic such as a refractive index and a light path length. For example, the modulator element control circuit 14 changes a refractive index of a display part by changing a voltage to be applied to a display part of the spatial light modulator element 13. Consequently, light 110 radiated onto a display part is diffracted based on a refractive index of the display part, as necessary. Specifically, a phase distribution of light 110 radiated onto the phase-modulation-type spatial light modulator element 13 is modulated depending on an optical characteristic of a display part. Note that a method for driving the spatial light modulator element 13 by the modulator element control circuit 14 is not limited to an example described herein.

The projection optical system 15 projects modulated light 130 modulated by the spatial light modulator element 13 as projected light 150. Modulated light 130 modulated by the spatial light modulator element 13 is projected as projected light 150 by the projection optical system 15.

The light path switching means 30 is a portion for switching a light path of light to be projected from the projection device 10 in response to control of the control device 20. Note that a configuration and a layout of the light path switching means 30 in FIG. 3 are an example, and do not limit the scope of the present invention.

The light path switching means 30 in a state of FIG. 3 deforms the movable part 33 in response to control of the control device 20, and moves the reflecting mirror 31 between the spatial light modulator element 13 and the projection optical system 15. In the example of FIG. 3, the movable part 33 is an expanding/contracting member that expands and contracts in response to control of the control device 20. The reflecting mirror 31 is connected to one end of the movable part 33 being an expanding/contracting member, and is put in and out of a light path of modulated light 130 being emitted light from the spatial light modulator element 13, accompanied by an expanding/contracting operation of the movable part 33.

As illustrated in FIG. 4, when the reflecting mirror 31 is moved on a route of modulated light 130, the modulated light 130 is reflected on a reflection surface of the reflecting mirror 31, and is projected onto a second display area as projected light 300. The projected light 300 projected from the projection device 10 is displayed on a second display area as display information. Note that, in FIG. 4, nothing is disposed on a light path of projected light 300. Alternatively, an optical system may be disposed on a light path of projected light 300.

Further, the light path switching means 30 in a state of FIG. 4 deforms the movable part 33 in response to control of the control device 20, and moves the reflecting mirror 31 from a position between the spatial light modulator element 13 and the projection optical system 15.

When the reflecting mirror 31 is deviated from a route of modulated light 130, as illustrated in FIG. 3, the modulated light 130 is incident onto the projection optical system 15, and is projected onto a first display area as projected light 150. The projected light 150 projected from the projection device 10 is displayed on a first display area as display information.

[Control Device]

Figure 5:
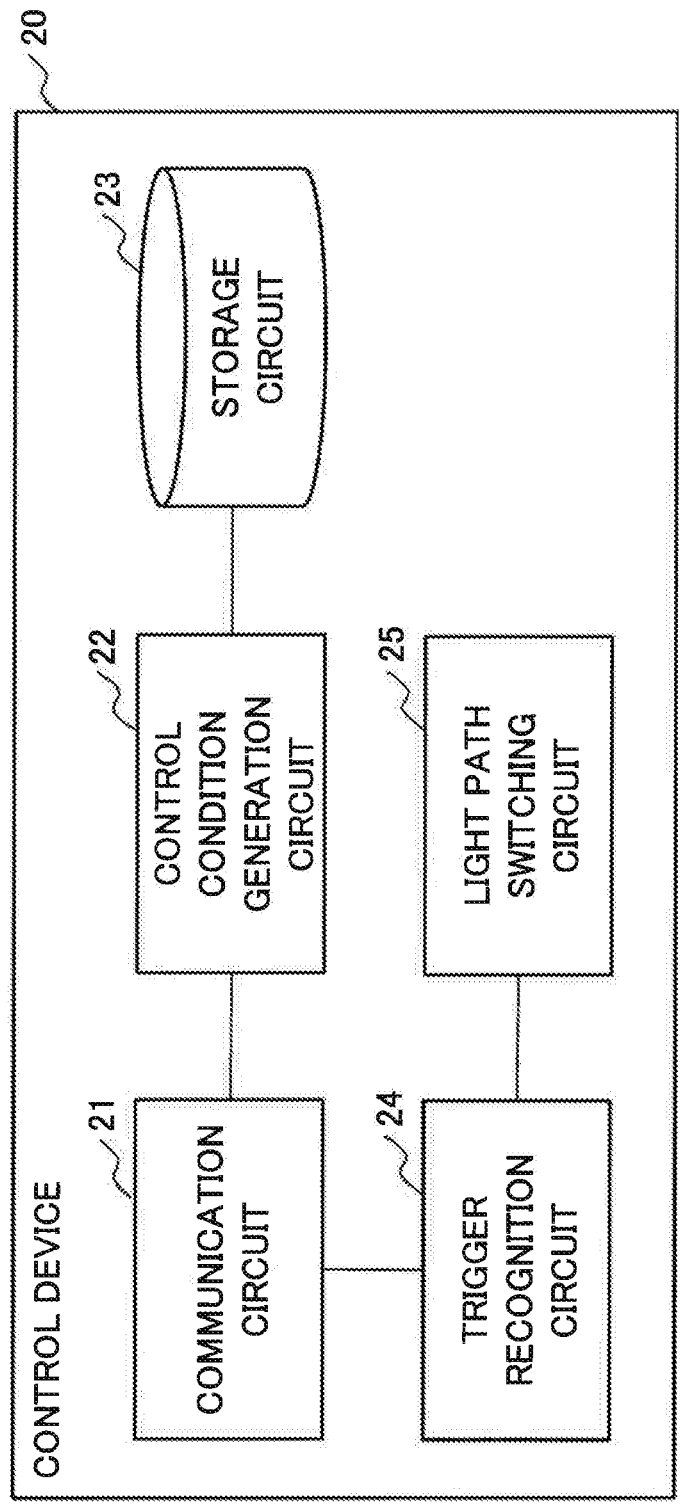
FIG. 5 is a block diagram illustrating a configuration of a control device of the display system according to the first example embodiment of the present invention.

Next, the control device 20 is described in detail. FIG. 5 is a block diagram illustrating a configuration of the control device 20 of the display system 1. As illustrated in FIG. 5, the control device 20 includes a communication circuit 21, a control condition generation circuit 22, a storage circuit 23, a trigger recognition circuit 24, and a light path switching circuit 25.

The communication circuit 21 receives, from a host system (not illustrated) of the display system 1, a condition (hereinafter, a display condition) for displaying appropriate display information on each display area at an appropriate timing. The communication circuit 21 outputs a received display condition to the control condition generation circuit 22.

Further, the communication circuit 21 receives, from the host system, a switching signal for designating switching a display area. The communication circuit 21 outputs a received switching signal to the trigger recognition circuit 24.

The host system analyzes data acquired by a camera or the like, which is set on a moving route of a user who is allowed to see display information. Further, when the host system recognizes the user from the analysis data, the host system transmits, to the display system 1, a display condition for displaying display information to be seen by the user on an appropriate display area at an appropriate timing.

Further, the host system generates a switching signal serving as a trigger for switching a display area where display information is displayed. A switching signal may be included in a display condition, or may be generated as a signal different from a display condition.

When the host system determines that it is appropriate to switch a display area from the above-described analysis data, the host system outputs, to the display system 1, a switching signal for designating switching a display area. For example, when a user is about to enter a first display area, when projected light 150 is projected from the display system 1 onto the first display area, the host system outputs a switching signal to the display system 1. Further, when the host system determines that display information is allowed to be displayed on a first display area, the host system outputs, to the display system 1, a switching signal for switching a display area where display information is displayed from a second display area to the first display area.

A display condition to be received by the communication circuit 21 is a condition to be set for displaying appropriate display information at an appropriate timing on a wall or a ceiling nearby a user, based on identification information for identifying a user, position information of a user, a point of time when these pieces of information are acquired, and the like. Identification information is information capable of identifying a user, such as a name and an identification (ID) of a user. Position information is information indicating a position of a user in terms of a two-dimensional coordinate system or a three-dimensional coordinate system. A moving direction and a speed of a user are a moving direction and a speed of a user in motion. Further, a display condition may be set based on information such as a moving direction and a speed of a user, and a destination.

The control condition generation circuit 22 acquires, from the storage circuit 23, a basic pattern constituting a pattern to be displayed on each display area, based on a display condition acquired from the communication circuit 21. The control condition generation circuit 22 generates a pattern to be displayed on a display part of the spatial light modulator element 13 by moving or combining a basic pattern stored in the storage circuit 23. Note that, when the spatial light modulator element 13 is constituted of a phase-modulation-type element, a pattern with which desired display information is displayed on each display area is a phase distribution associated with the display information.

The control condition generation circuit 22 generates a control condition for projecting an acquired pattern onto an appropriate display area at an appropriate timing, and outputs the generated control condition to the projection device 10. A control condition includes a light source control condition and a modulator element control condition to be described later.

The control condition generation circuit 22 generates a light source control condition indicating at which timing and what degree of output of light is output from the light source 11. A light source control condition is a condition for controlling a timing at which the light source 11 emits light, and corresponds to a condition for controlling a timing at which desired display information is projected. The control condition generation circuit 22 outputs, to a light source driving power supply of the projection device 10, a generated light source control condition.

Further, the control condition generation circuit 22 generates a modulator element control condition indicating at which timing and what pattern is displayed on a display part of the spatial light modulator element 13. A modulator element control condition is a condition for displaying a pattern associated with desired display information on a display part of the spatial light modulator element 13 at an appropriate timing. A timing at which a pattern associated with desired display information is displayed on a display part of the spatial light modulator element 13 is synchronized with a driving timing of the light source 11 included in a light source control condition. The control condition generation circuit 22 outputs, to the modulator element control circuit 14 of the projection device 10, a generated modulator element control condition.

A basic pattern constituting a pattern for displaying desired display information on each display area is stored in the storage circuit 23. For example, a basic pattern generated by a host system may be acquired in advance, and may be stored in the storage circuit 23. A number of display patterns to be stored in the storage circuit 23 becomes finite, when a number of pieces of information to be displayed on each display area is small. Therefore, it is possible to reduce a capacity of the storage circuit 23. Note that not only a basic pattern, but also any pattern may be stored in the storage circuit 23.

When a switching signal is included in a display condition received by the communication circuit 21, the trigger recognition circuit 24 outputs a switching operation signal for operating the light path switching circuit 25 in response to the switching signal. Note that the trigger recognition circuit 24 may be omitted, and it may be configured in such a way that a switching signal is directly output from the communication circuit 21 to the light path switching circuit 25.

The light path switching circuit 25 deforms the movable part 33 of the light path switching means 30 in response to an acquired switching operation signal. In the example of FIG. 3, the light path switching circuit 25 expands and contracts the movable part 33 of the light path switching means 30 in response to an acquired switching operation signal. For example, the light path switching circuit 25 expands the movable part 33 as illustrated in FIG. 4, and locates the reflecting mirror 31 between the spatial light modulator element 13 and the projection optical system 15. Note that the light path switching circuit 25 may be configured to deform the movable part 33 in response to a switching signal received from the communication circuit 21.

Further, as illustrated in FIG. 4, when receiving a switching operation signal in a state that the reflecting mirror 31 is located between the spatial light modulator element 13 and the projection optical system 15, the light path switching circuit 25 deforms the movable part 33 to contract the movable part 33. In this way, as illustrated in FIG. 3, the light path switching circuit 25 prevents the reflecting mirror 31 from being located between the spatial light modulator element 13 and the projection optical system 15.

[Control System]

Figure 6:
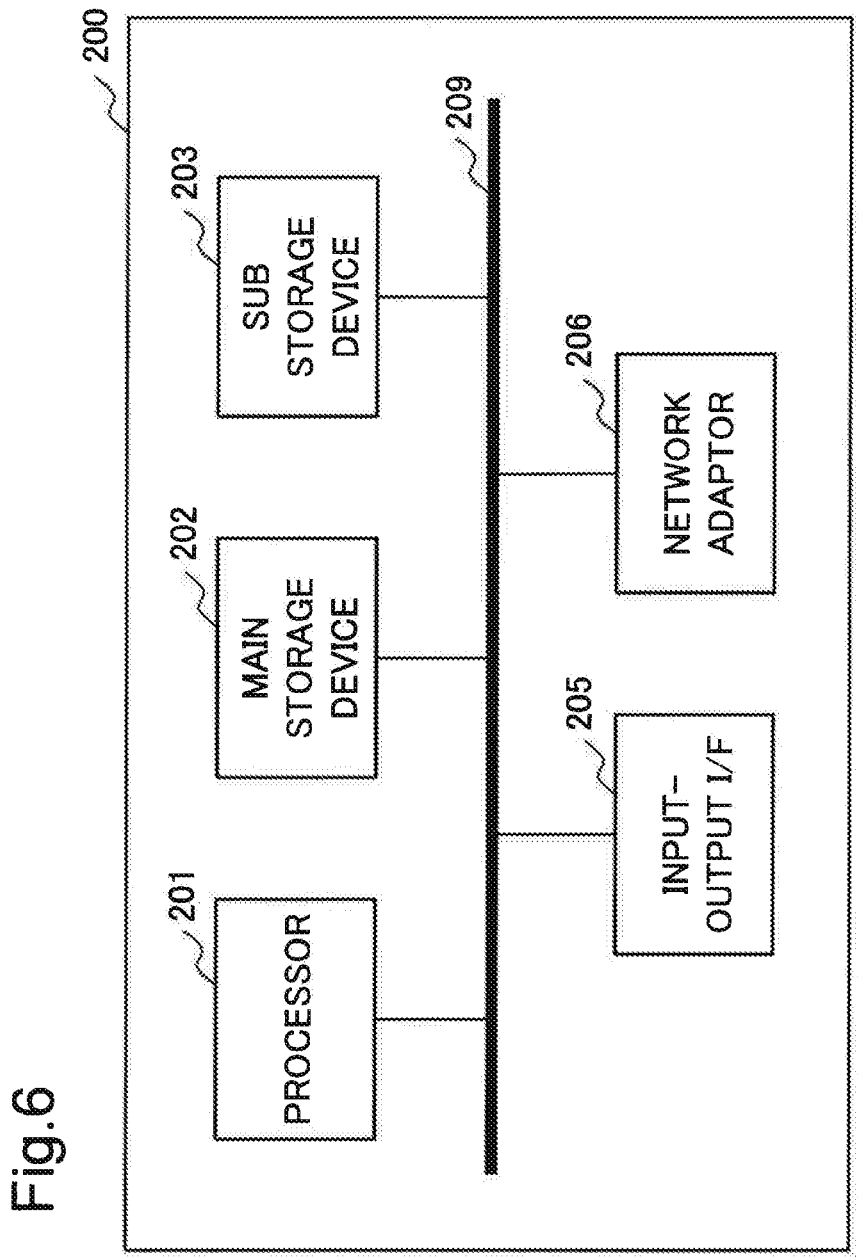
FIG. 6 is a block diagram illustrating an example of a hardware configuration for achieving a control system of the display system according to the first example embodiment of the present invention.

Herein, a hardware configuration for implementing a control system of a display system according to the present example embodiment is described using FIG. 6. Note that a control system 200 in FIG. 6 is an example of a control system for implementing a display system of the present example embodiment, and does not limit the scope of the present invention.

As illustrated in FIG. 6, the control system 200 includes a processor 201, a main storage device 202, a sub storage device 203, an input-output interface 205, and a network adaptor 206. The processor 201, the main storage device 202, the sub storage device 203, the input-output interface 205, and the network adaptor 206 are connected to one another via a bus 209 to enable data transmission and reception. Further, the processor 201, the main storage device 202, the sub storage device 203, and the input-output interface 205 are connected to a network such as the Internet or an intranet via the network adaptor 206. The control system 200 is connected to a server of a host system or a computer via a network, and information for projecting display information is acquired from the host system.

The processor 201 is a central processing unit that expands a program stored in the sub storage device 203 or the like within the main storage device 202, and executes the expanded program. In the present example embodiment, the processor 201 may be configured to employ a software program installed in the control system 200. The processor 201 performs arithmetic processing and control processing to be executed by the control device 20.

The main storage device 202 has an area where a program is expanded. The main storage device 202 may be a volatile memory such as a dynamic random access memory (DRAM), for example. Further, a non-volatile memory such as a magnetoresistive random access memory (MRAM) may be configured/added as the main storage device 202.

The sub storage device 203 is a means for storing data such as a phase distribution of display information. The sub storage device 203 is constituted of a local disk such as a hard disk or a flash memory. Note that the sub storage device 203 may be omitted by configuring in such a way that a phase distribution of display information is stored in the main storage device 202.

The input-output interface 205 is a device for connecting between the control system 200 and peripheral equipment, based on a connection standard between the control system 200 and the peripheral equipment. The network adaptor 206 is an interface for connection to a network such as the Internet and an intranet, based on a standard or a specification. Note that, in FIG. 6, an interface is abbreviated as an I/F. The input-output interface 205 and the network adaptor 206 may be standardized an interface to be connected to external equipment.

The control system 200 may be configured to be connectable to input equipment such as a keyboard, a mouse, and a touch panel, as necessary. These pieces of input equipment are employed for input of information and settings. Note that, when a touch panel is employed as input equipment, a display screen of display equipment may also serve as an interface of the input equipment. Data transmission and reception between the processor 201 and input equipment may be mediated via the input-output interface 205.

The network adaptor 206 is connected to a host system such as another computer or a server through a network. A host system transmits, to the control system 200, a phase distribution of display information to be employed in each example embodiment via the network adaptor 206. A host system may generate a phase distribution of display information to be employed in each example embodiment by the own device, or may be acquired from another device.

Further, the control system 200 may include display equipment for displaying information. When display equipment is included, the control system 200 may preferably include a display control device (not illustrated) for controlling display of the display equipment. Display equipment may be connected to the control system 200 via the input-output interface 205.

Further, the control system 200 may include a reader/writer, as necessary. A reader/writer is connected to the bus 209. A reader/writer mediates reading of data/program from a recording medium, writing of a processing result of the control system 200 in a recording medium, and the like between the processor 201 and an unillustrated recording medium (program recording medium). A recording medium may be implemented by, for example, a semiconductor recording medium such as a secure digital (SD) card, and a universal serial bus (USB) memory. Further, a recording medium may be implemented by a magnetic recording medium such as a flexible disk, an optical recording medium such as a compact disc (CD) and a digital versatile disc (DVD), or another recording medium.

[Projection Optical System]

Figure 7:
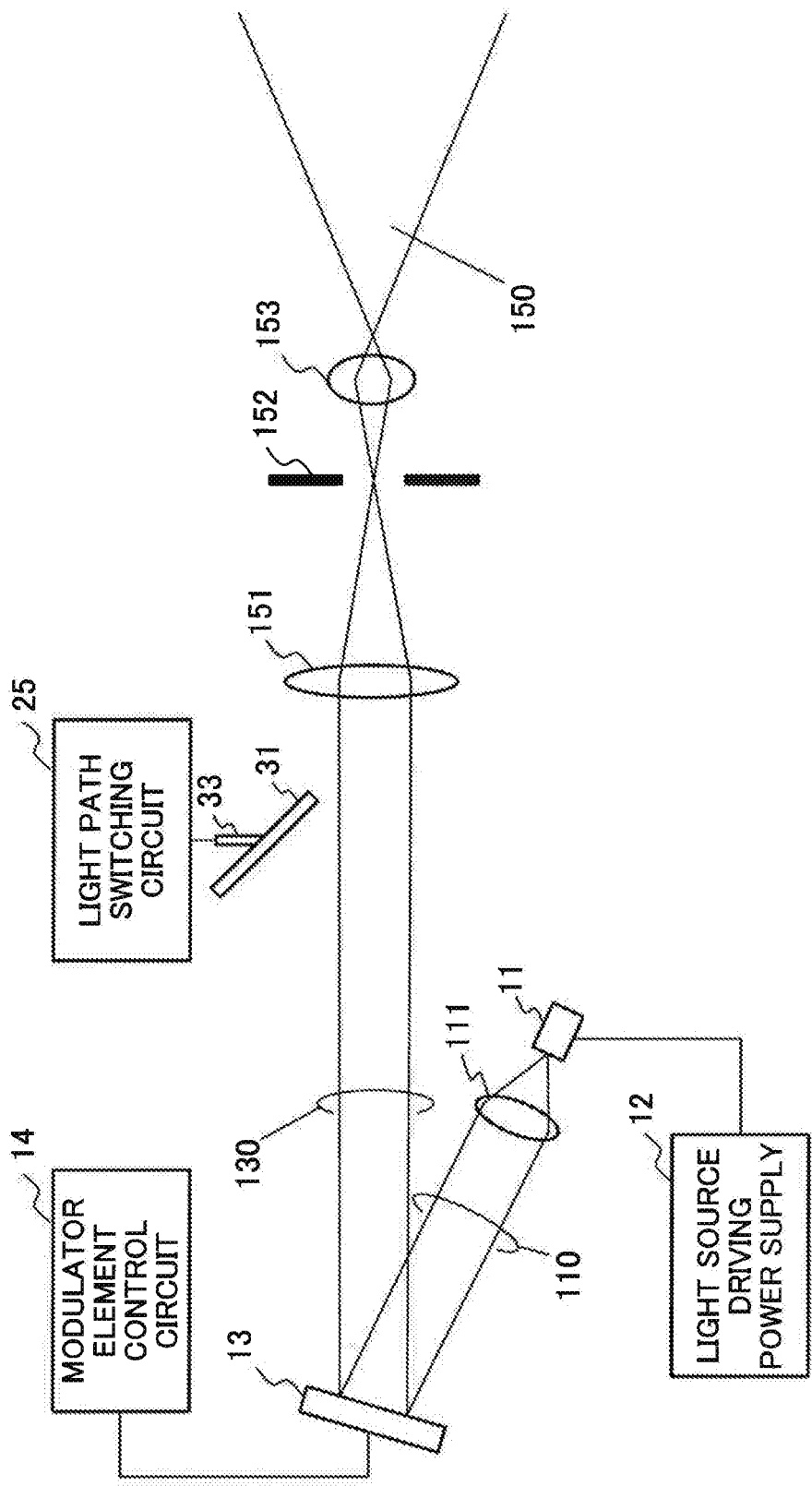
FIG. 7 is a conceptual diagram of a configuration including an optical system of the display system according to the first example embodiment of the present invention.
Figure 8:
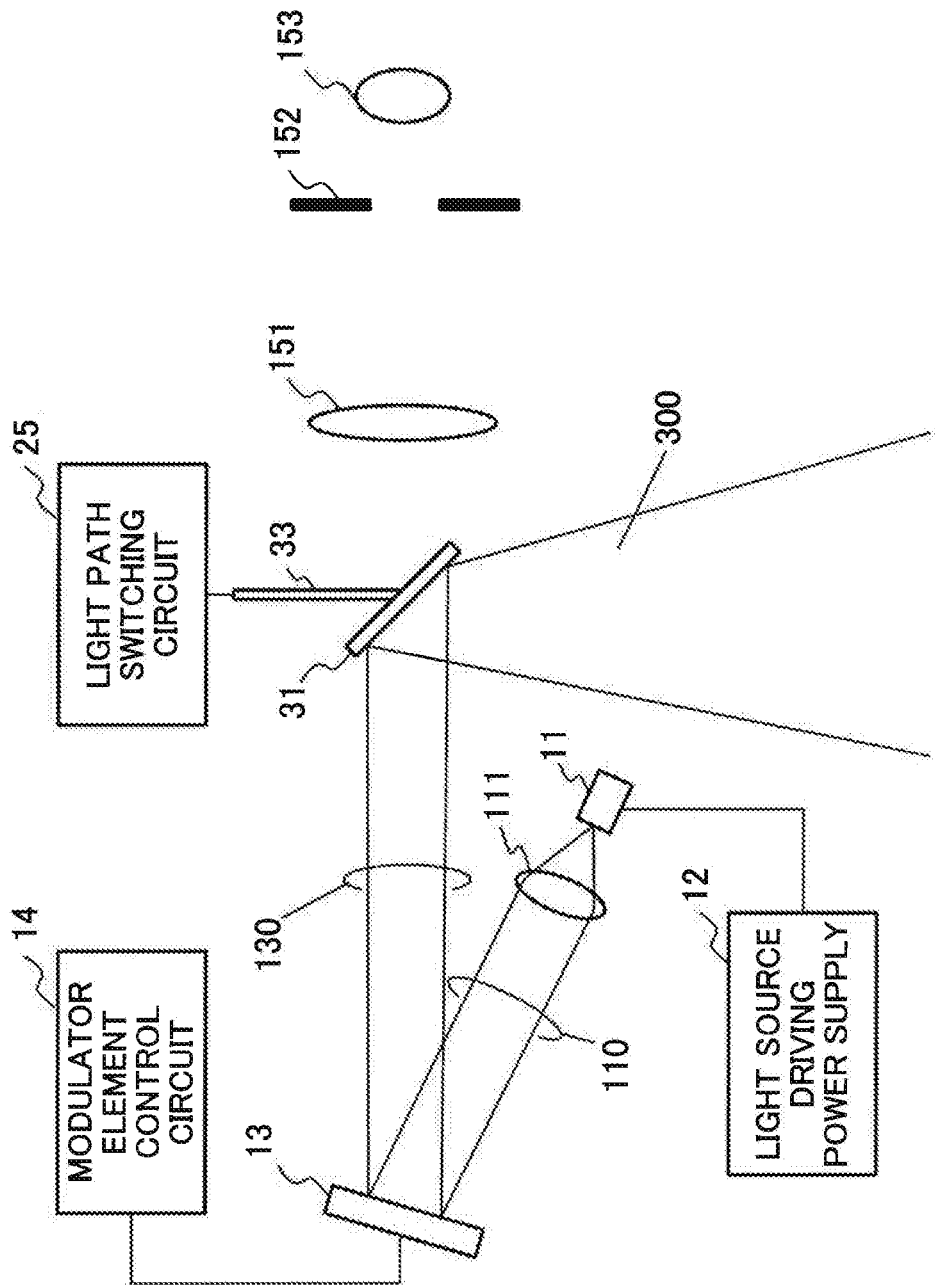
FIG. 8 is a conceptual diagram illustrating another state of the configuration including the optical system of the display system according to the first example embodiment of the present invention.

Next, details of the projection optical system 15 of the projection device 10 are described using FIGS. 7 and 8.

FIG. 7 is a conceptual diagram of a configuration including the projection optical system 15 of the projection device 10. FIG. 8 is a conceptual diagram illustrating another state of the configuration including the projection optical system 15 of the projection device. In FIGS. 7 and 8, light emitted from the light source 11 is converted into light 110 in which phases are aligned by a collimator 111.

As illustrated in FIGS. 7 and 8, the projection optical system 15 includes a Fourier transform lens 151, an aperture 152, and a projection lens 153.

The Fourier transform lens 151 is an optical lens for forming, at a focal point nearby, an image to be formed when modulated light 130 reflected on a display part of the spatial light modulator element 13 is projected to infinity. In FIGS. 7 and 8, a focal point is formed at a position of the aperture 152.

The aperture 152 has a function of blocking high-order light included in light collected by the Fourier transform lens 151, and specifying a display area. Specifically, the aperture 152 blocks a part of light collected by the Fourier transform lens 151. An opening portion of the aperture 152 is opened with a size smaller than an outermost periphery of a display area at a position of the aperture 152, and is set in such a way as to block a peripheral area of display information at the position of the aperture 152. For example, an opening portion of the aperture 152 is formed into a rectangular shape or a circular shape. The aperture 152 is preferably set at a focal point position of the Fourier transform lens 151. However, as far as it is possible to exhibit a function of cancelling high-order light, the aperture 152 may be deviated from a focal point position.

The projection lens 153 is an optical lens for enlarging and projecting light that is collected by the Fourier transform lens 151 and passes through the aperture 152. The projection lens 153 projects projected light 150 onto the reflecting mirror 31 in such a way that display information associated with a phase distribution input to the spatial light modulator element 13 is displayed on each display area.

When the display system 1 is employed for the purpose of projecting a line drawing such as a simple symbol, projected light 150 projected from the projection optical system 15 is not uniformly projected onto each display area, but is intensively projected onto a portion such as a character, a symbol, and a frame constituting display information. In this case, the display system 1 substantially reduces an emission amount of light 110. Therefore, it is possible to suppress an entire output of light. Specifically, the display system 1 is constituted of the compact and low-electric-power light source 11, it is possible to lower an output of the light source driving power supply 12 for driving the light source 11, and possible to reduce entire electric power consumption.

In the example of FIGS. 7 and 8, the reflecting mirror 31 is configured to move at a position in front of the Fourier transform lens 151. The light path switching circuit 25 deforms the movable part 33 in response to control of the control device 20, and locates the reflecting mirror 31 on a route of projected light 150.

In the example of FIGS. 7 and 8, an incident angle of light 110 is made non-orthogonal to a display part of the spatial light modulator element 13. Specifically, in the present example embodiment, an emission axis of light 110 from the light source 11 is made oblique to a display part of the spatial light modulator element 13. Setting an emission axis of light 110 oblique to a display part of the spatial light modulator element 13 enables to improve efficiency, since it is possible to cause the light 110 to be incident onto a display part of the spatial light modulator element 13 without employing a beam splitter.

Note that, in the example of FIG. 8, it is assumed that by inserting the reflecting mirror 31 on a light path of modulated light 130, projected light 300 is projected onto a display area at a position where light reaches a Fraunhofer region, and display information is displayed on the display area. As far as an area is a display area at a position where light reaches a Fraunhofer region, it is possible to project display information focus freely without the Fourier transform lens 151. Also in the following, when projected light 300 is projected without the Fourier transform lens 151, it is assumed that display information is displayed on a display area at a position where light reaches a Fraunhofer region.

Installation Example

Figure 9:
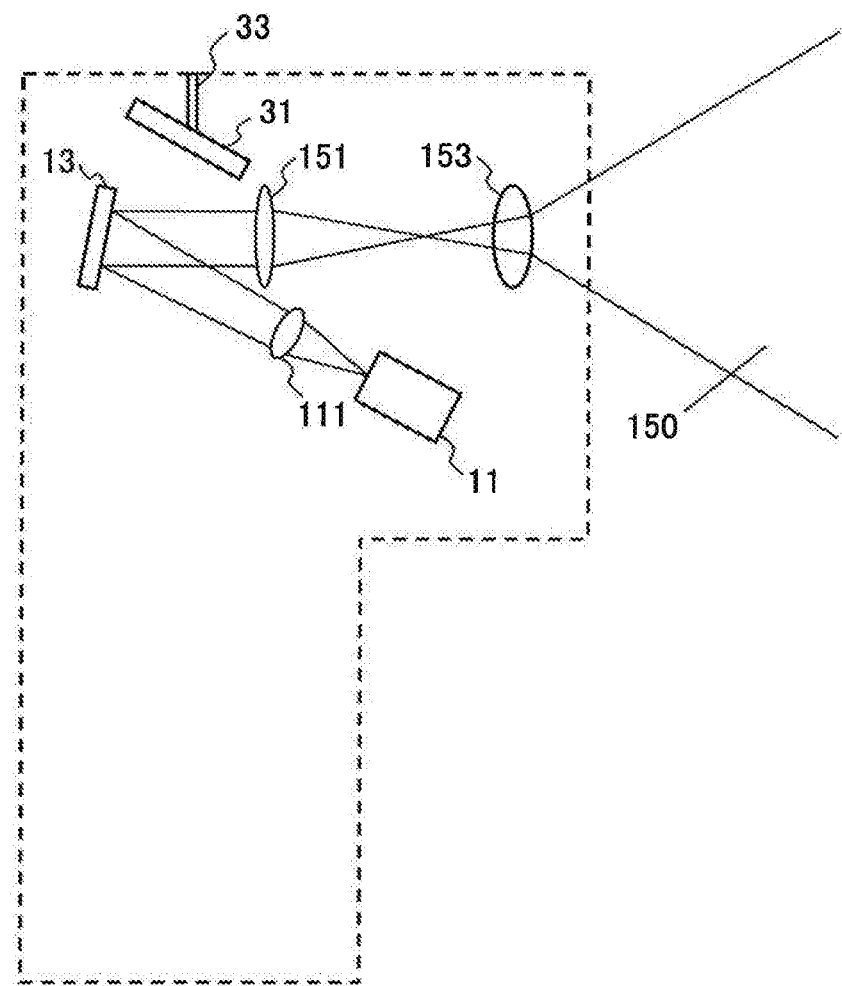
FIG. 9 is a conceptual diagram illustrating an installation example of the display system according to the first example embodiment of the present invention.
Figure 10:
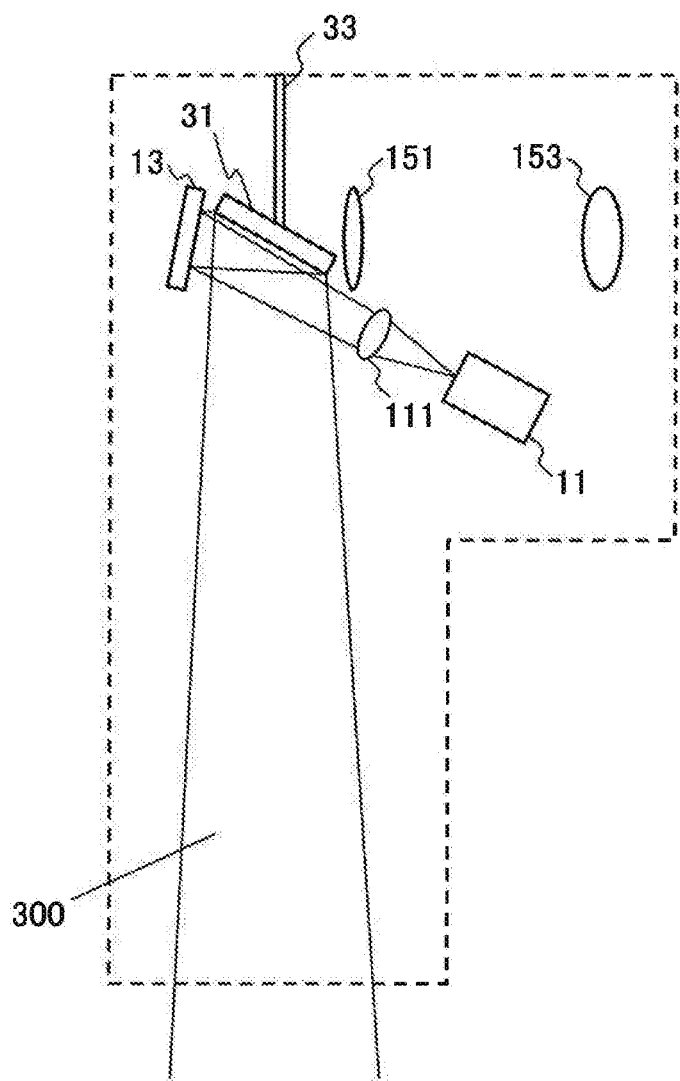
FIG. 10 is a conceptual diagram illustrating another state of the installation example of the display system according to the first example embodiment of the present invention.

Next, a configuration example of a device in which the display system 1 is installed is described using FIGS. 9 and 10. Note that it is assumed that reference numbers omitted in FIGS. 9 and 10 denote elements similar to those in FIGS. 7 and 8.

FIG. 9 is an example in which an optical system and the light path switching means 30 of the display system 1 are installed in a housing indicated by a broken-line frame. Similarly to FIG. 7, light emitted from a light source is radiated onto a display part of the spatial light modulator element 13 by being converted into light 110 in which phases are aligned by the collimator 111. The spatial light modulator element 13 emits modulated light 130 acquired by modulating the radiated light 110 toward the Fourier transform lens 151. Light via the Fourier transform lens 151 is projected onto a first display area as projected light 150 by the projection lens 153.

FIG. 10 illustrates a state after a switching operation signal is input to the light path switching circuit 25 in a state of FIG. 9, and the movable part 33 is operated. When the movable part 33 is operated, the reflecting mirror 31 is inserted between the spatial light modulator element 13 and the Fourier transform lens 151. The reflecting mirror 31 reflects modulated light 130 modulated by a display part of the spatial light modulator element 13 toward a second display area different from a first display area. Light reflected by the reflecting mirror 31 is projected onto the second display area as projected light 300.

In a normal condition, the display system 1 projects projected light 150 onto a first display area, as illustrated in FIG. 9. At this occasion, it is assumed that a user moves to a position (first display area) where the user is radiated with projected light 150 from the display system 1. A host system outputs a switching signal in such a way that projected light 150 is not continued to be projected, when a user is located in a first display area.

When receiving a switching signal from a host system, the display system 1 switches in such a way that projected light 300 is projected onto a second display area, as illustrated in FIG. 10, while using the signal as a trigger. As far as the display system 1 is in a state of FIG. 10, there is no likelihood that projected light 300 from the display system 1 is radiated onto a user.

Conversely, a user may move to a second display area in a state of FIG. 10. In this case, the host system outputs a switching signal in such a way that projected light 300 is not continued to be projected, as far as a user is located in a second display area.

When receiving a switching signal from the host system, the display system 1 switches in such a way that projected light 150 is projected onto a first display area, as illustrated in FIG. 9, while using the signal as a trigger. As far as the display system 1 is in a state of FIG. 9, there is no likelihood that projected light 150 from the display system 1 is radiated onto a user.

Modification Example

Figure 11:
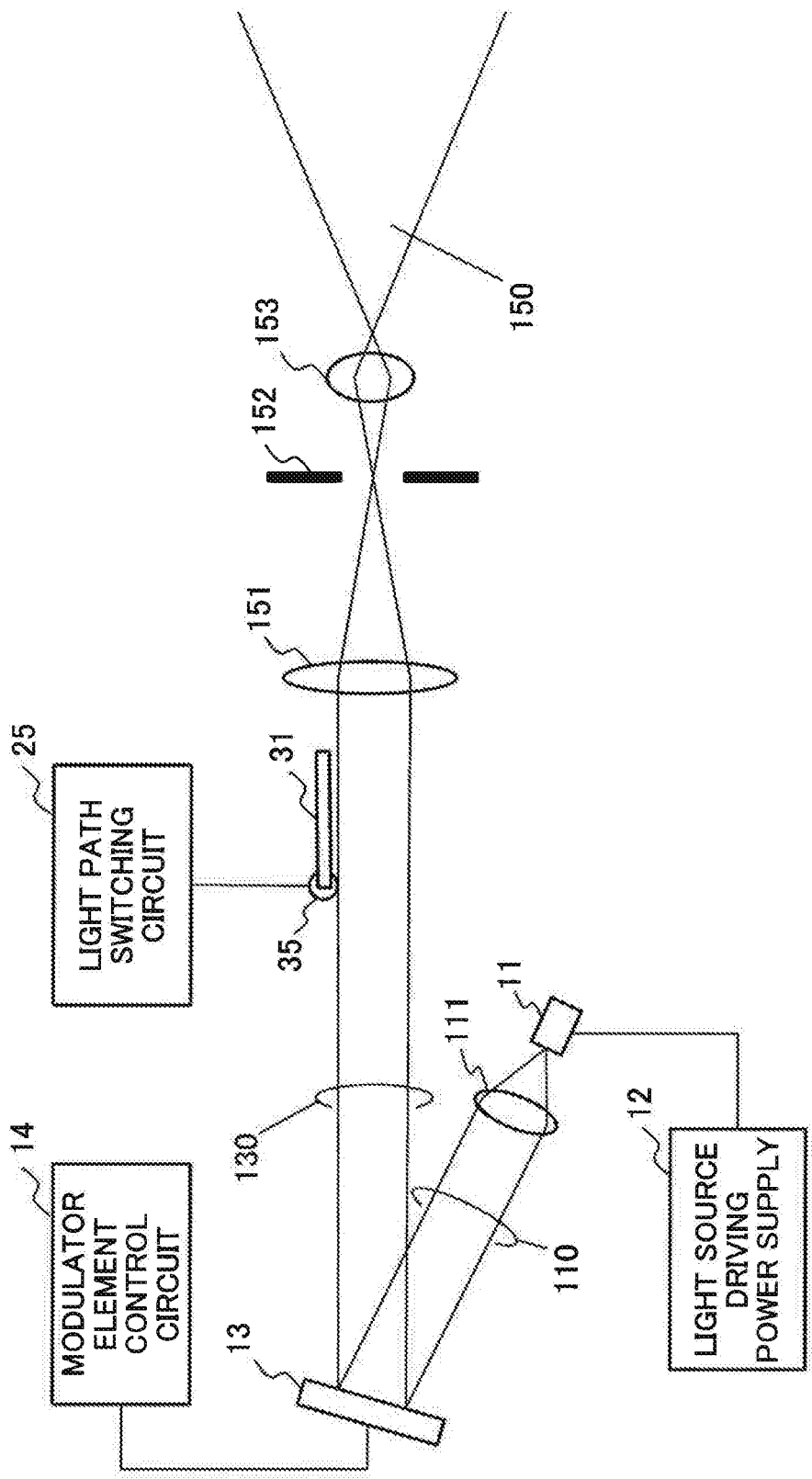
FIG. 11 is a conceptual diagram of a configuration including an optical system of a display system according to a modification example of the first example embodiment of the present invention.
Figure 12:
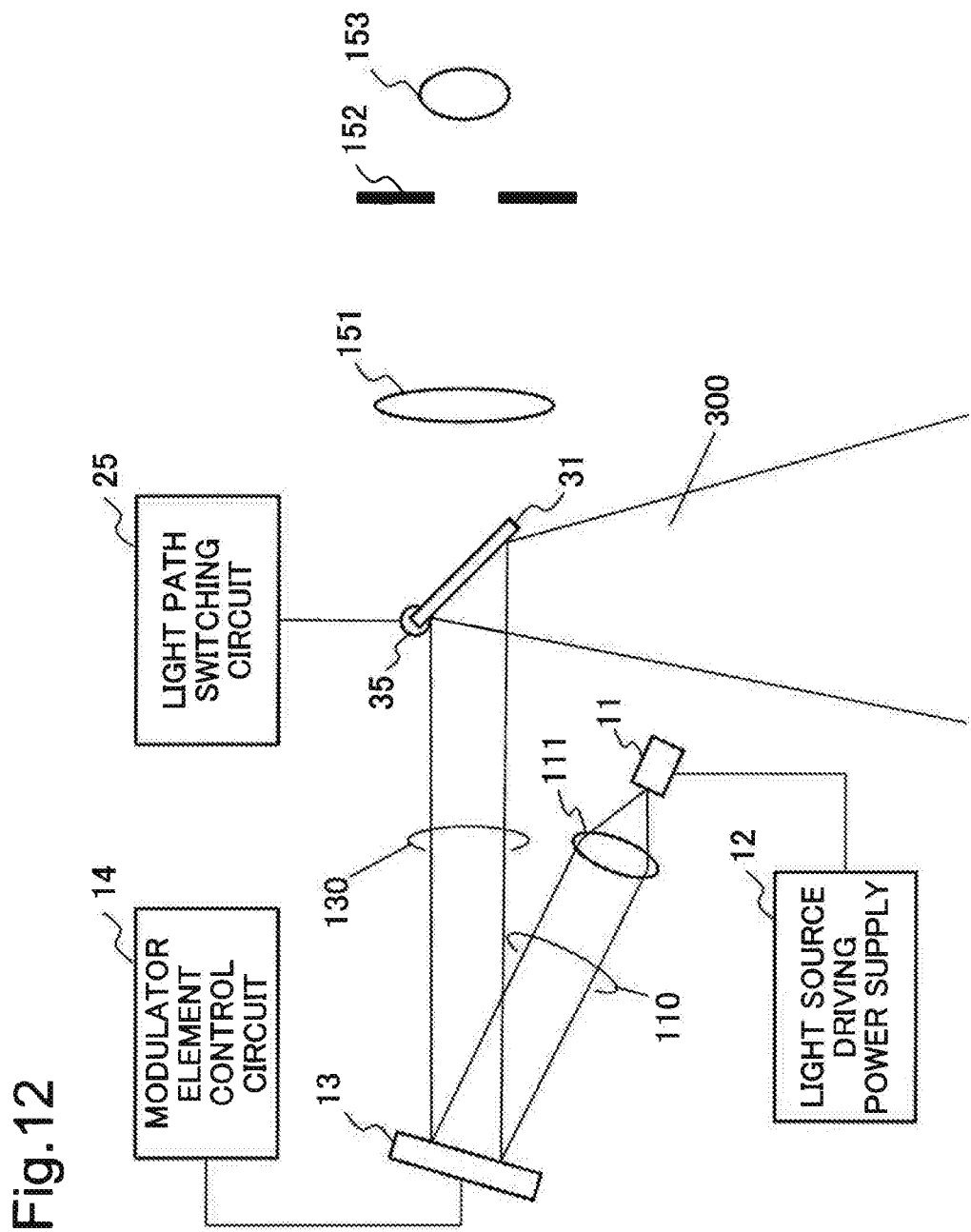
FIG. 12 is a conceptual diagram illustrating another state of the configuration including the optical system of the display system according to the modification example of the first example embodiment of the present invention.

FIG. 11 is a conceptual diagram including a configuration of a modification example of the projection device 10. FIG. 12 is a conceptual diagram illustrating another state of the modification example of the projection device 10. The modification example is different from the configuration of FIG. 7 in a mechanism for changing a position of a reflecting mirror 31.

In the modification example, a side of the reflecting mirror 31 is held by a rotatable movable part 35 (also referred to as a rotating member). In a state of FIG. 11, the reflecting mirror 31 is not located on a light path of modulated light 130 emitted from a spatial light modulator element 13. At this occasion, a display system 1 projects projected light 150 onto a first display area.

When receiving a switching signal, a light path switching circuit 25 rotates the movable part 35 clockwise by about 45 degrees. At this occasion, as illustrated in FIG. 12, the reflecting mirror 31 is moved on a light path of modulated light 130, and the display system 1 projects projected light 300 onto a second display area.

Specifically, in the present modification example, the movable part 35 is a rotating member which rotates in response to control of a control device 20. The reflecting mirror 31 is put in and out of a light path of modulated light 130 being emitted light from the spatial light modulator element 13, accompanied by a rotating operation of the movable part 35 being a rotating member.

Note that the above-described movable part is an example, and the present example embodiment is not limited to the above-described shape and structure.

Application Example

Figure 13:
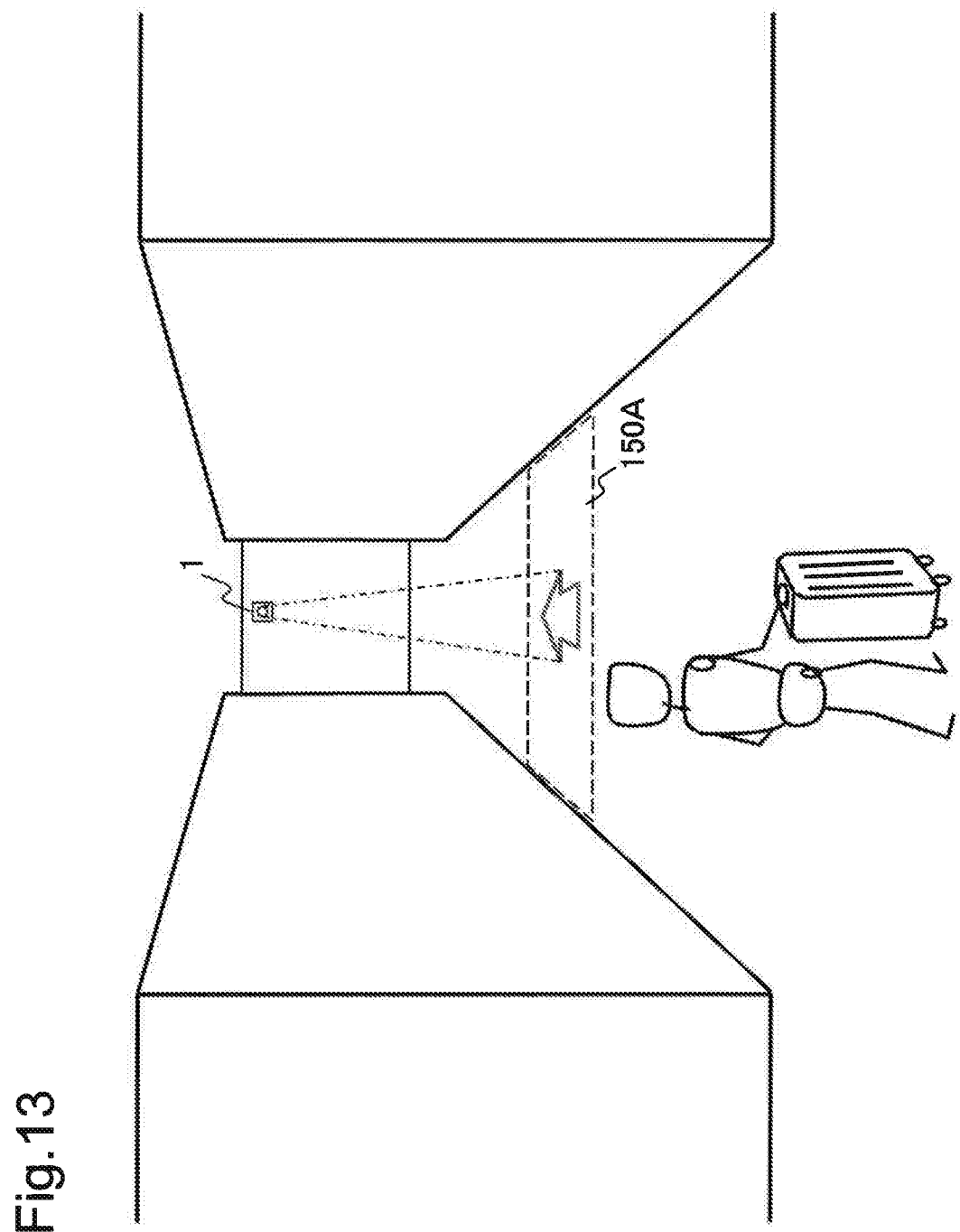
FIG. 13 is a conceptual diagram illustrating an operation example of an application example of the display system according to the first example embodiment of the present invention.
Figure 14:
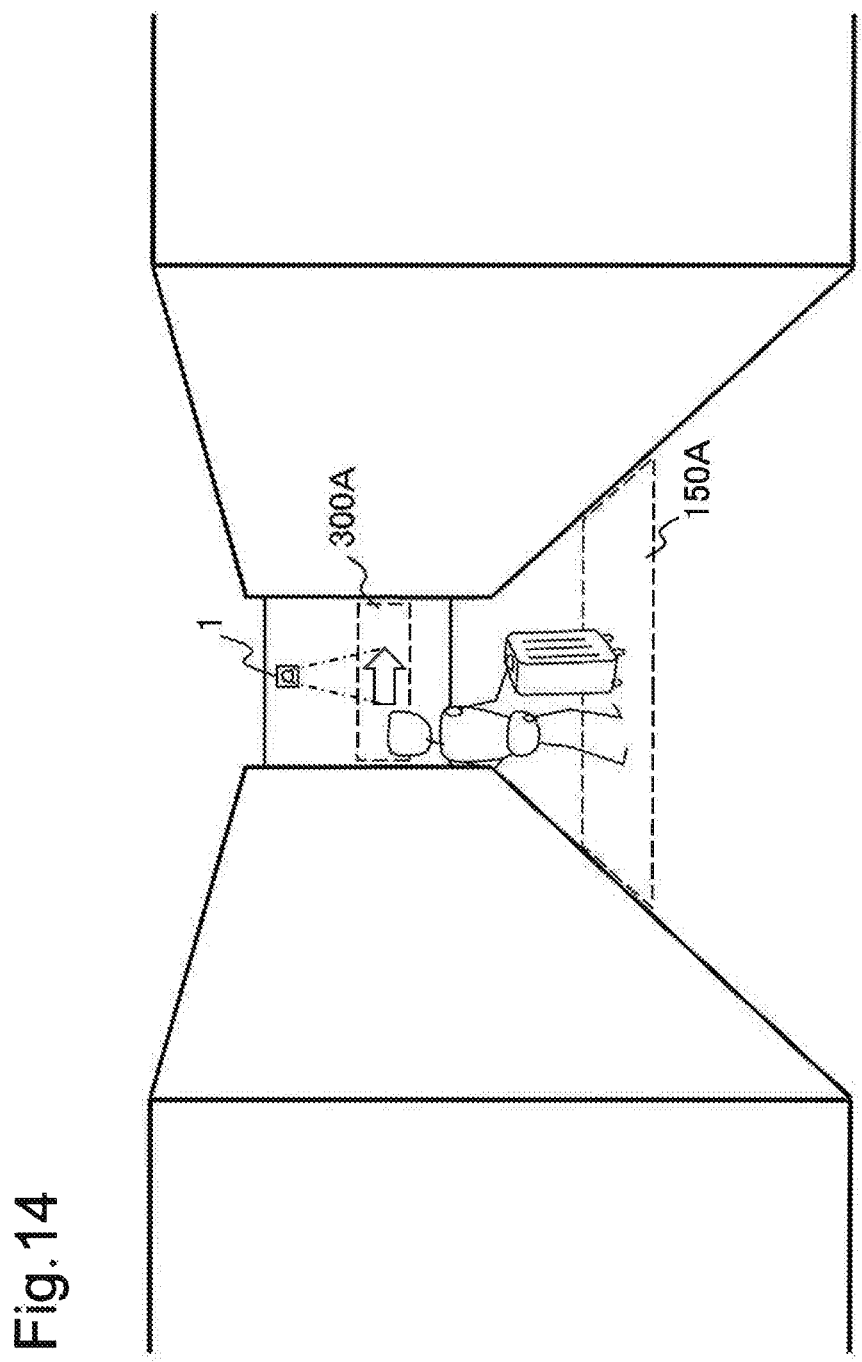
FIG. 14 is a conceptual diagram illustrating an operation example of an application example of the display system according to the first example embodiment of the present invention.

FIGS. 13 and 14 are an application example in which the display system 1 is installed in a passage. In the example of FIGS. 13 and 14, the display system 1 is installed on a wall surface at an end of a passage.

In the example of FIG. 13, the display system 1 displays display information (arrow) for guiding a user to a display area 150A at or about a middle of a passage. When a user is guided to display information displayed on the display area 150A, the user is supposed to pass the display area 150A. When the user reaches the display area 150A in a state that display information is projected on the display area 150A, light may be radiated onto the user.

In the present application example, an unillustrated camera or sensor grasps a position and a state of a user to be guided. Then, as illustrated in FIG. 14, the display area is switched to a display area 300A on a wall surface at an end of the passage, before the user reaches the display area 150A.

By controlling as described above, a user will not be radiated with light, even when the user reaches the display area 150A. Further, a user can watch display information without visibility changing, even when display information is switched from the display area 150A to the display area 300A.

As described above, the display system of the present example embodiment is able to switch display information to be projected onto another display area, when a user enters a certain display area. Therefore, a display system of the present example embodiment enables to operate safely in various installation locations such as near a ceiling and near a floor. A display system of the present example embodiment is able to project display information onto any display area easily seen by a user. Specifically, a display system of the present example embodiment enables to provide a display system for displaying easily-seen display information toward any display area, without selecting an installation location.

Further, a display system of the present example embodiment switches to display all pieces of display information on another display area, when a display area where display information is displayed is switched. Therefore, the present example embodiment enables to display display information of higher resolution on another display area, as compared with a case where a part of a display area is switched to another display area.

Second Example Embodiment

Next, a display system according to a second example embodiment of the present invention is described with reference to the drawings. The present example embodiment is different from the first example embodiment in a point that a projection direction changing mirror 40 for reflecting projected light 300 projected onto a second display area in a different direction is included. Note that the projection direction changing mirror 40 may be set on a light path of projected light 150 projected onto a first display area.

Figure 15:
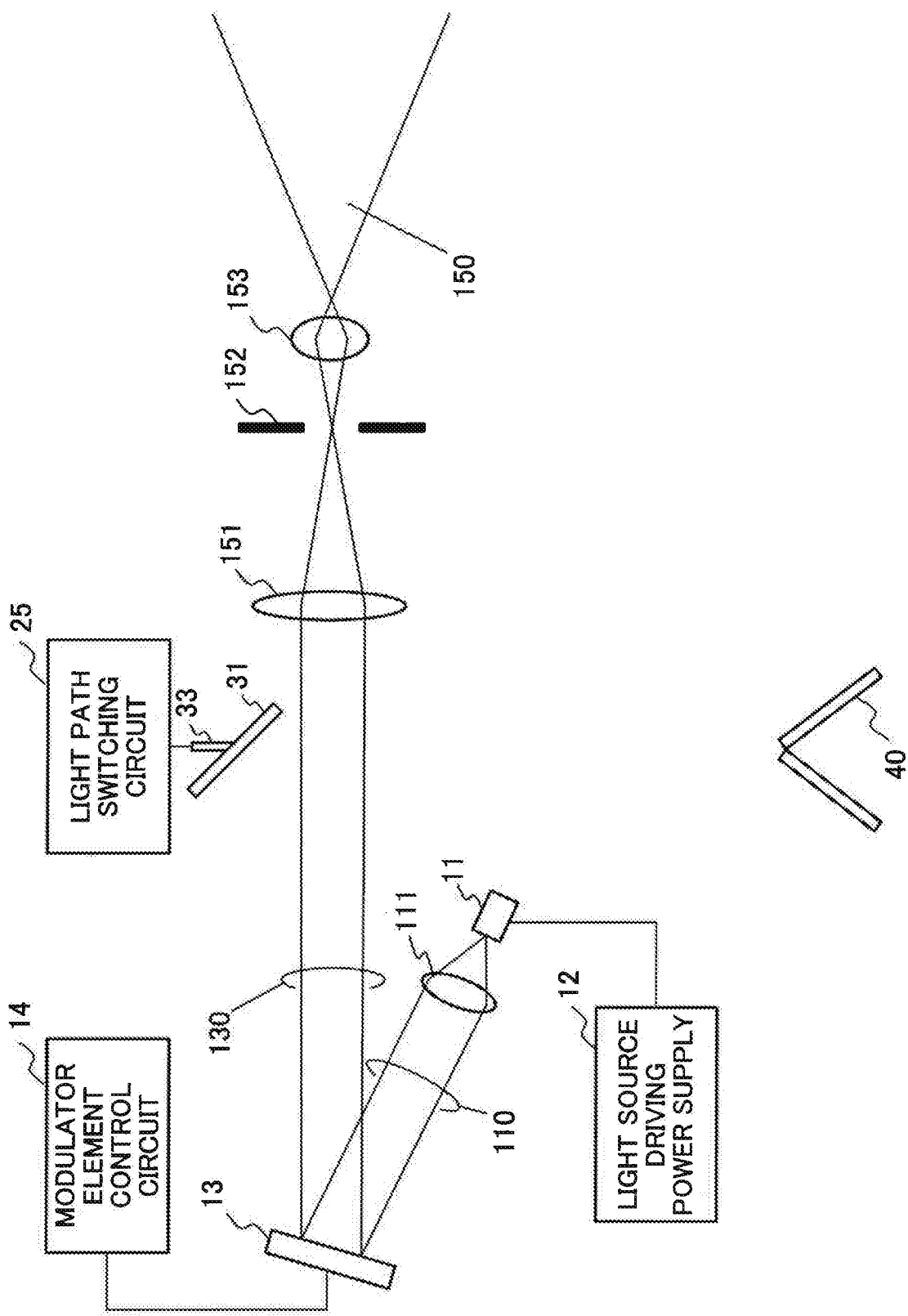
FIG. 15 is a conceptual diagram of a configuration including an optical system of a display system according to a second example embodiment of the present invention.
Figure 16:
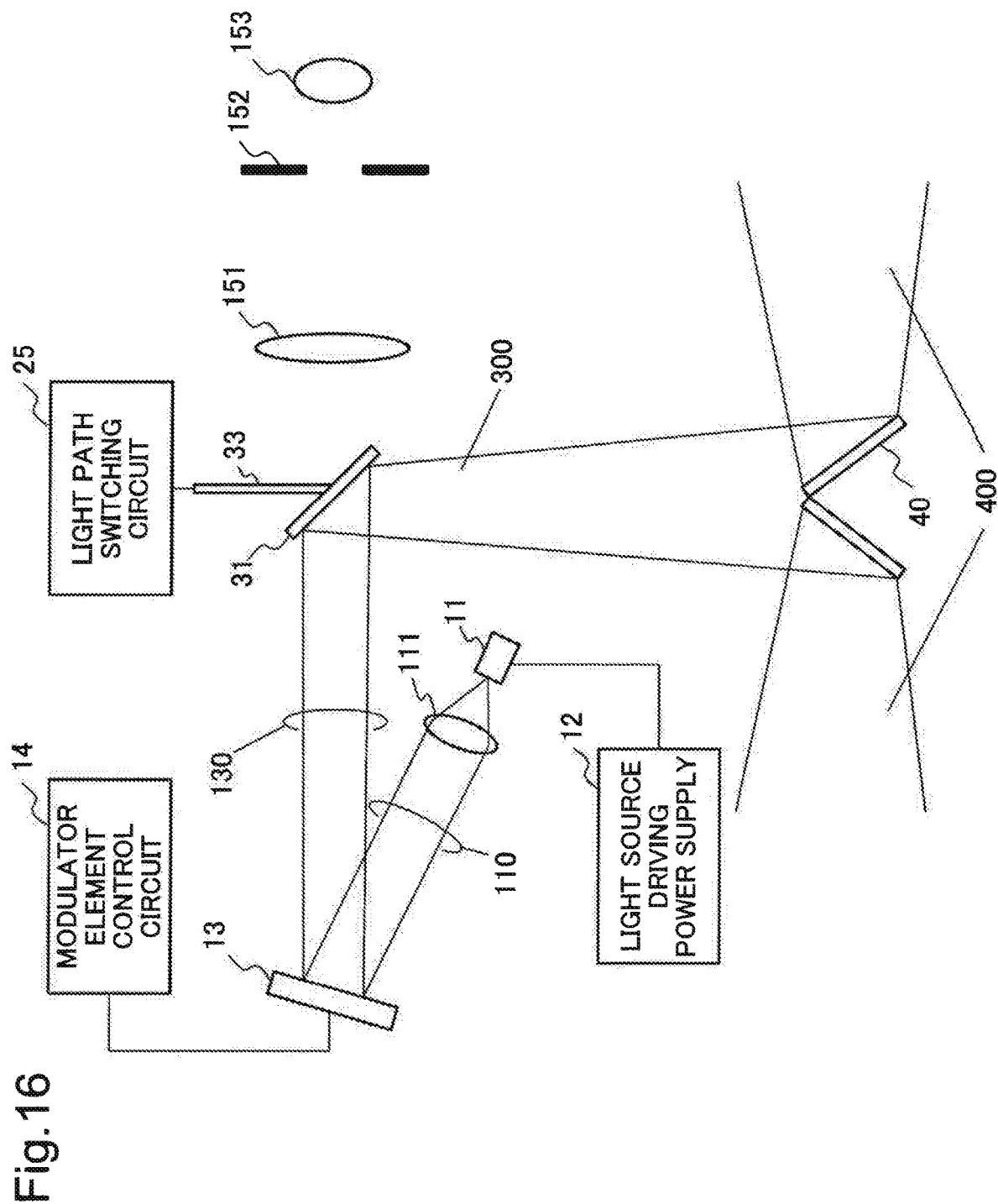
FIG. 16 is a conceptual diagram illustrating another state of the configuration including the optical system of the display system according to the second example embodiment of the present invention.

FIG. 15 is a conceptual diagram of a configuration including an optical system of a display system according to the present example embodiment. FIG. 16 is a conceptual diagram illustrating another state of the configuration including the optical system of the display system according to the present example embodiment.

As illustrated in FIG. 15, a display system in the present example embodiment includes the projection direction changing mirror 40. As illustrated in FIG. 16, the projection direction changing mirror 40 is disposed on a light path of projected light 300 reflected by a reflecting mirror 31. Projected light 400 reflected by the projection direction changing mirror 40 is projected in a direction (third display area) different from a second display area where projected light 300 is displayed.

Note that the projection direction changing mirror 40 may have a shape and a configuration different from the example of FIGS. 15 and 16. Combining a plurality of mirrors enables to further increase projection directions of projected light 400.

Figure 17:
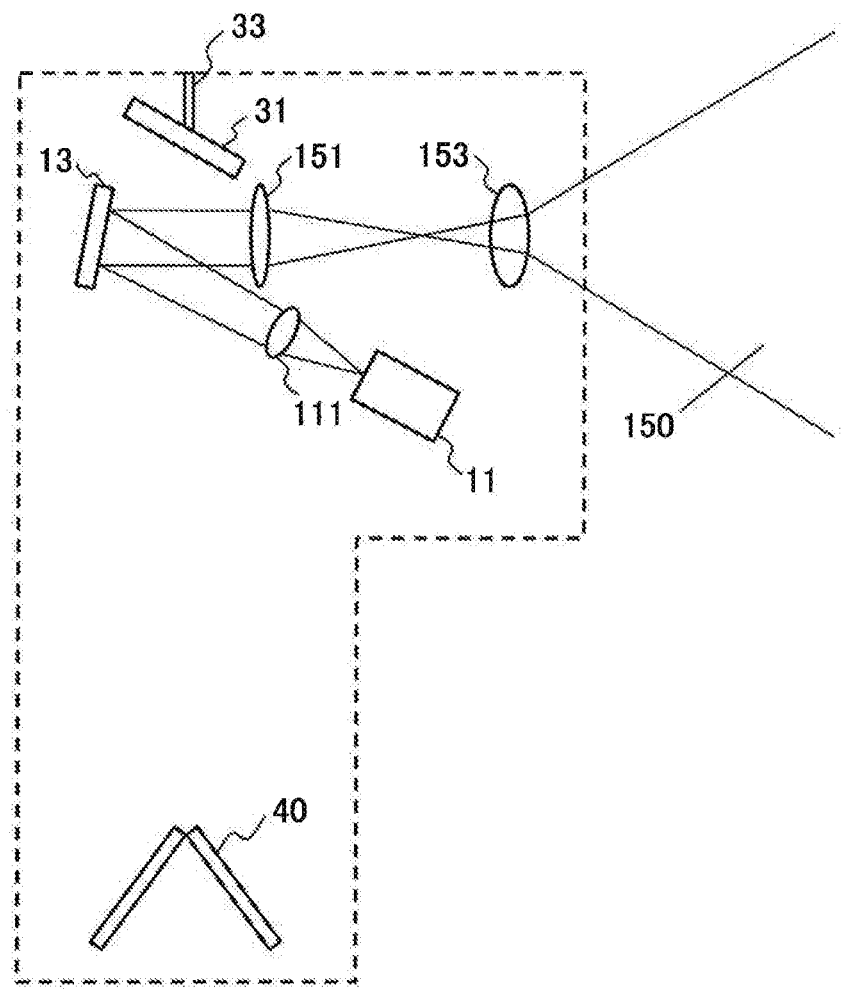
FIG. 17 is a conceptual diagram illustrating an installation example of the display system according to the second example embodiment of the present invention.
Figure 18:
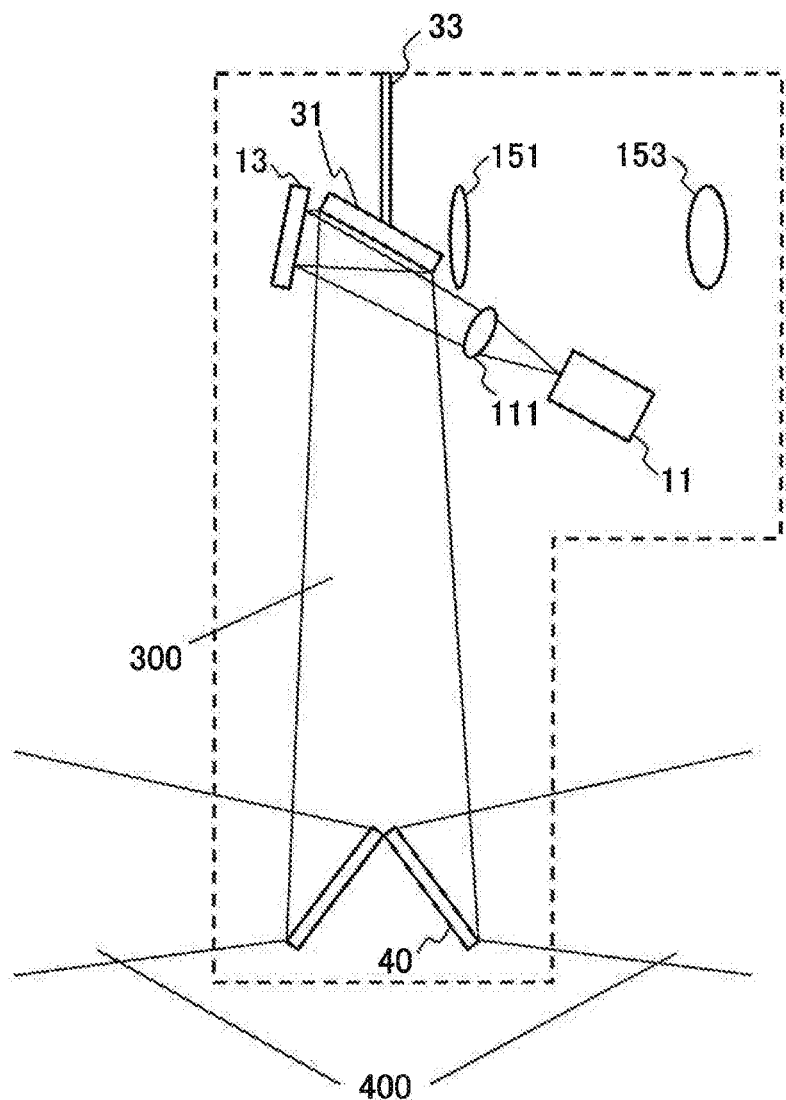
FIG. 18 is a conceptual diagram illustrating another state of the installation example of the display system according to the second example embodiment of the present invention.

FIGS. 17 and 18 are a configuration example of a device in which a display system in the present example embodiment is installed. Note that reference numbers omitted in FIGS. 17 and 18 denote elements similar to those in FIGS. 9 and 10.

Similarly to FIG. 9, FIG. 17 is an example in which an optical system, a light path switching means 30, and the projection direction changing mirror 40 of a display system are installed in a housing indicated by a broken-line frame. Similarly to FIG. 7, light emitted from a light source is radiated onto a display part of a spatial light modulator element 13 by being converted into light in which phases are aligned by a collimator 111. The spatial light modulator element 13 emits modulated light 130 acquired by modulating the radiated light 110 toward a Fourier transform lens 151. Light went through the Fourier transform lens 151 is projected onto a first display area as projected light 150 by a projection lens 153.

FIG. 18 illustrates a state after a switching operation signal is input to a light path switching circuit 25 in a state of FIG. 17, and a movable part 33 is operated. When the movable part 33 is operated, the reflecting mirror 31 is inserted between the spatial light modulator element 13 and the Fourier transform lens 151. The reflecting mirror 31 reflects modulated light 130 modulated by a display part of the spatial light modulator element 13 toward a second display area which is different from a first display area. Light reflected by the reflecting mirror 31 is projected onto the second display area as projected light 300. Further, the projected light 300 is projected as projected light 400 in a direction different from the second display area by the projection direction changing mirror 40.

In the example of FIG. 18, for example, projected light 400 is projected onto a foot end or the like. As illustrated in the example of FIG. 10, when the projection direction changing mirror 40 is not disposed, projected light 300 is projected downward. The example of FIG. 10 is appropriate for projecting display information onto a floor surface. Contrary to this, in the example of FIG. 18, projected light 400 is projected from below to another direction. Therefore, the example of FIG. 18 is not appropriate for a floor surface itself, but is appropriate for projection onto a wall surface or the like near a floor surface.

As described above, the present example embodiment enables to project light projected onto a second display area to another different direction.

Third Example Embodiment

Next, a display system 3 according to a third example embodiment of the present invention is described with reference to the drawings. The present example embodiment is different from the first example embodiment in a point that an imaging device 50 for capturing one of display areas is included.

Figure 19:
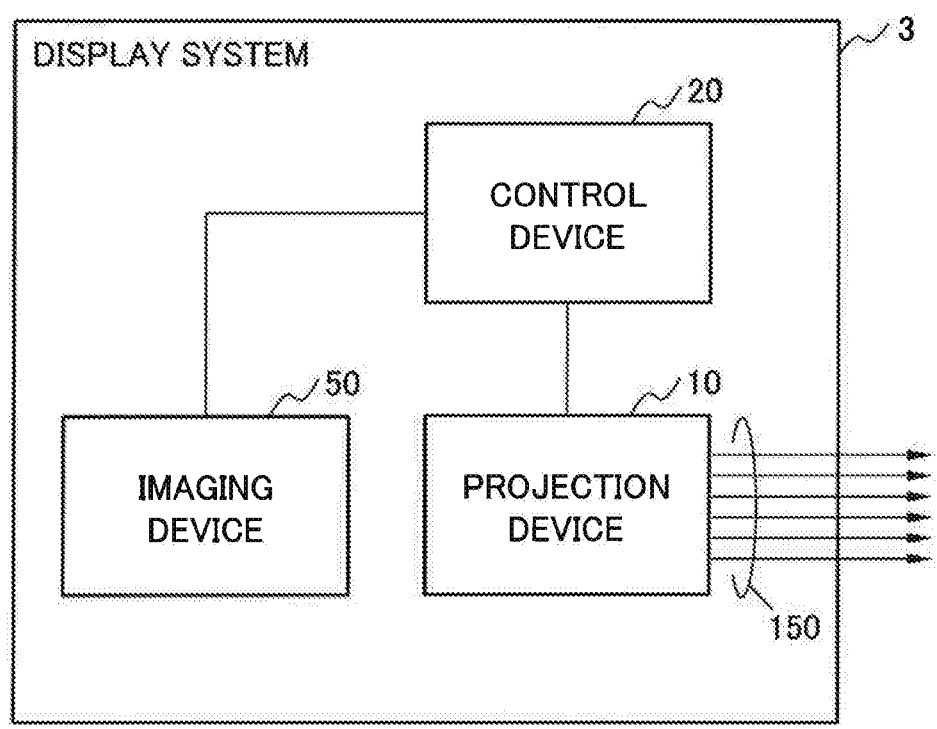
FIG. 19 is a conceptual diagram illustrating a configuration of a display system according to a third example embodiment of the present invention.
Figure 20:
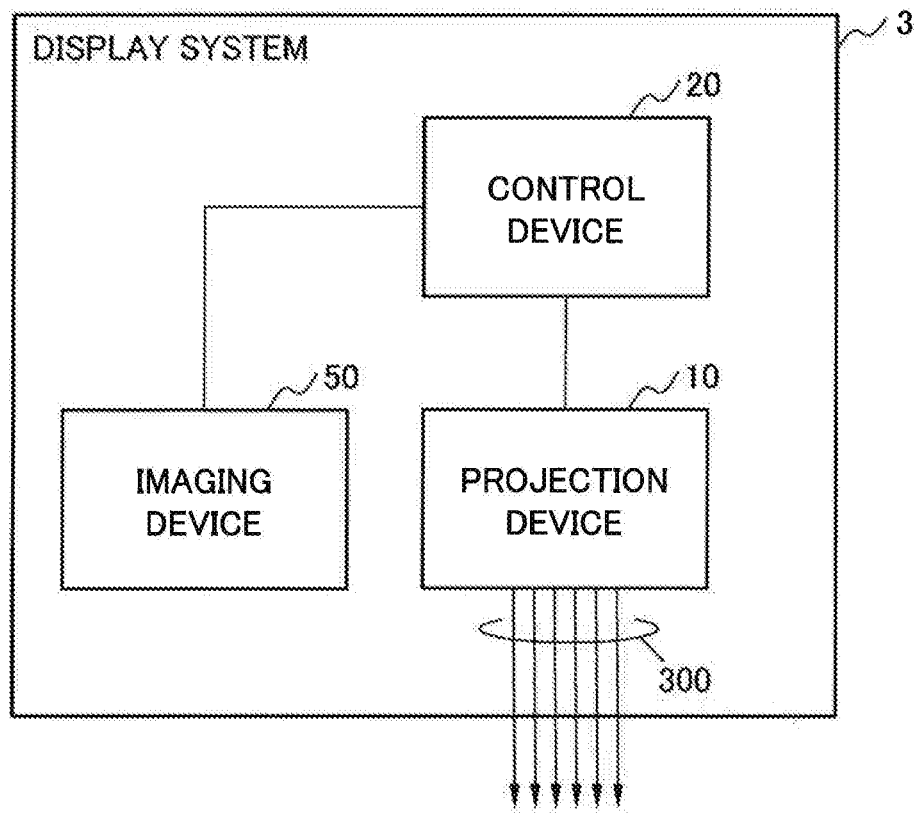
FIG. 20 is a conceptual diagram illustrating another state of the configuration of the display system according to the third example embodiment of the present invention.

FIG. 19 is a conceptual diagram illustrating a configuration of the display system 3 in the present example embodiment. Further, FIG. 20 is a conceptual diagram illustrating another state of the configuration of the display system 3 according to the present example embodiment. The display system 3 includes an imaging device 50, in addition to a projection device 10 and a control device 20. Similarly to the display system 1 in the first example embodiment, the projection device 10 of the display system 3 projects projected light 150 onto a first display area in response to control of the control device 20, and projects projected light 300 onto a second display area.

The display system 3 in the present example embodiment is different from the display system 1 in the first embodiment in a point that the imaging device 50 is included. The imaging device 50 is configurable as a general camera.

Figure 21:
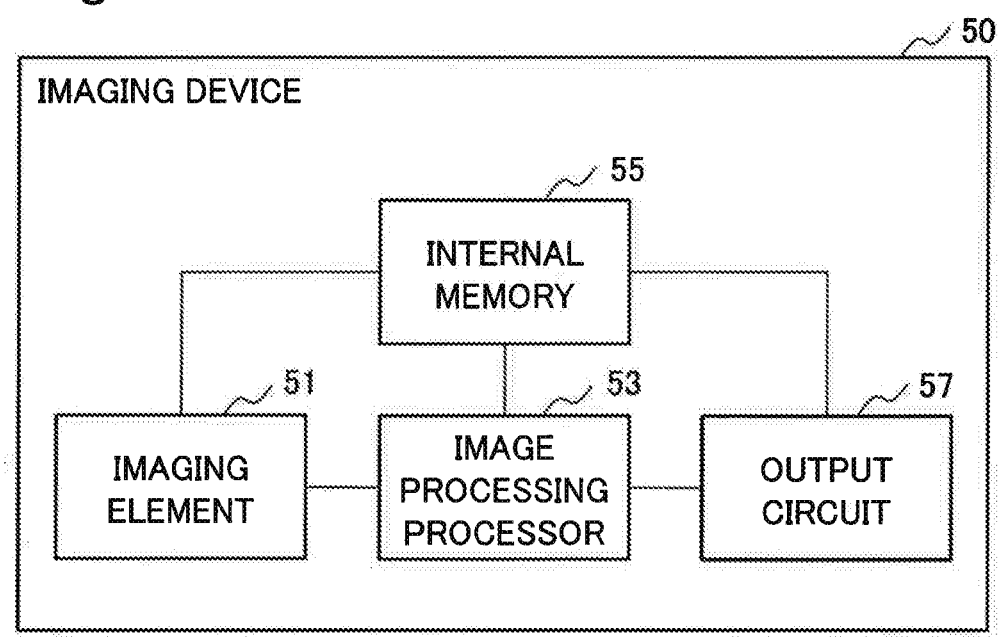
FIG. 21 is a block diagram illustrating a configuration of an imaging device of the display system according to the third example embodiment of the present invention.

FIG. 21 is a block diagram illustrating a configuration of the imaging device 50. As illustrated in FIG. 21, the imaging device 50 includes an imaging element 51, an image processing processor 53, an internal memory 55, and an output circuit 57.

The imaging element 51 is an element for capturing a predetermined imaging area including a first display area and a second display area, and acquiring imaging data of the imaging area, for example. The imaging element 51 is a photoelectric conversion element formed by fabricating semiconductor components into an integrated circuit. The imaging element 51 is implementable by a solid-state imaging element such as a charge-coupled device (CCD) or a complementary metal-oxide-semiconductor (CMOS), for example. Generally, the imaging element 51 is constituted of an element for capturing light in a visible range. Alternatively, the imaging element 51 may be constituted of an element capable of capturing/detecting an electromagnetic wave such an infrared ray, an ultraviolet ray, an X-ray, a gamma ray, a radio wave, and a microwave.

The image processing processor 53 is an integrated circuit for performing image processing such as dark current correction, interpolation operation, color space conversion, gamma correction, aberration correction, noise reduction, and image compression with respect to imaging data captured by the imaging element 51. Note that, when image information is output without being processed, the image processing processor 53 may be omitted.

The internal memory 55 is a storage element for temporarily storing image information that is not completely processed when image processing is performed by the image processing processor 53, and processed image information. Note that image information captured by the imaging element 51 may be temporarily stored in the internal memory 55. The internal memory 55 may be constituted of a general memory.

The output circuit 57 outputs image information processed by the image processing processor 53 to the control device 20.

Figure 22:
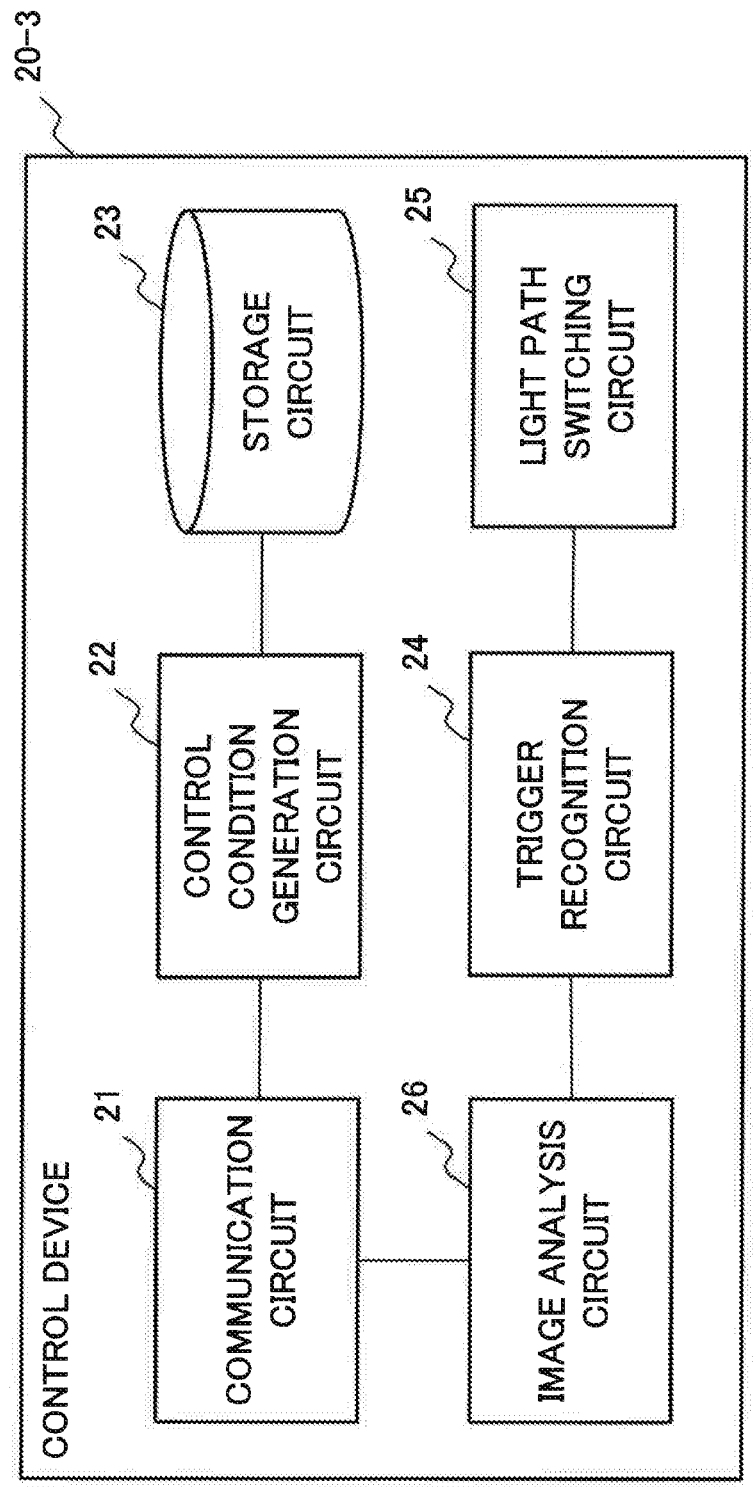
FIG. 22 is a block diagram illustrating a configuration of a control device of the display system according to the third example embodiment of the present invention.

FIG. 22 is a block diagram illustrating a configuration of a control device 20-3 in the present example embodiment. In the control device 20-3, an image analysis circuit 26 is added to the control device 20 in the first example embodiment.

A communication circuit 21 acquires image information from the imaging device 50. The communication circuit 21 outputs acquired image information to the image analysis circuit 26.

The image analysis circuit 26 analyzes acquired image information, and verifies whether or not it is necessary to switch a light path depending on the image information. When detecting that a target onto which light is not supposed to be projected enters an image, the image analysis circuit 26 generates a switching signal. For example, when detecting a detection target such as a person within an image, the image analysis circuit 26 analyzes motion of the target, and calculates a point of time when the target enters a display area. The image analysis circuit 26 outputs a switching signal to a trigger recognition circuit 24 synchronously with a timing when a detection target enters the display area. Note that the image analysis circuit 26 preferably includes a point of time when a detection target enters a display area in a switching signal.

When receiving a switching signal from the image analysis circuit 26, the trigger recognition circuit 24 generates a switching operation signal. The trigger recognition circuit 24 outputs, to a light path switching circuit 25, a switching operation signal synchronously with a timing when a detection target enters a display area during light projection.

When a point of time when a detection target enters a display area is not included in a switching signal, the trigger recognition circuit 24 may generate a switching operation signal synchronously with receiving a switching signal, and output the switching operation signal to the light path switching circuit 25. Further, when a point of time when a detection target enters a display area is included in a switching signal, the trigger recognition circuit 24 may adjust a timing relating to generation and output of a switching operation signal by the own circuit.

The light path switching circuit 25 deforms a movable part 33 of a light path switching means 30 in response to a switching operation signal, similarly to the display system 1 in the first example embodiment.

Application Example

Figure 23:
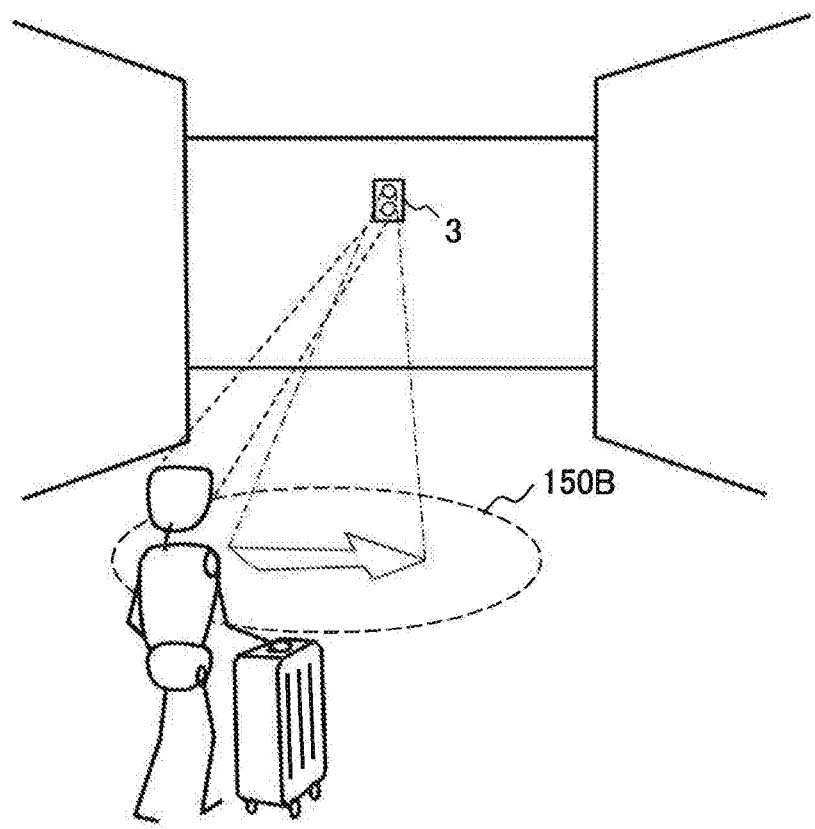
FIG. 23 is a conceptual diagram illustrating an operation example of an application example of the display system according to the third example embodiment of the present invention.
Figure 24:
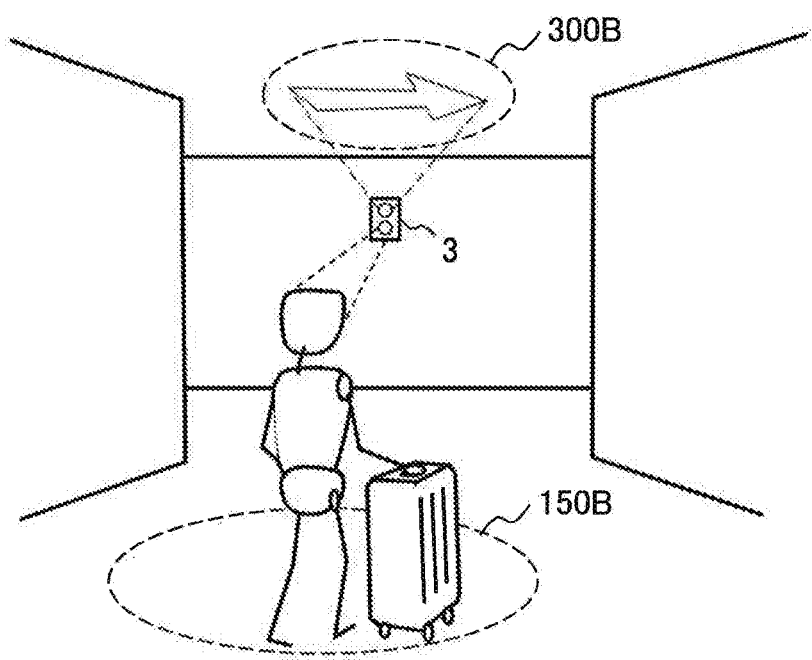
FIG. 24 is a conceptual diagram illustrating an operation example of an application example of the display system according to the third example embodiment of the present invention.

FIGS. 23 and 24 are an application example of the display system 3. In the example of FIGS. 23 and 24, the display system 3 is installed on a wall surface at an end of a passage.

In the example of FIG. 23, the display system 3 displays, on a display area 150B at or about a middle of a passage, display information (arrow) for guiding a user. When being guided to display information displayed on the display area 150B, a user is supposed to pass the display area 150B. If a user reaches the display area 150B in a state that display information is projected on the display area 150B, the user may be radiated with light.

In the present application example, the imaging device 50 grasps a position and a state of a user to be guided. Then, as illustrated in FIG. 24, a display area is switched to a display area 300B on a wall surface at an end of a passage, before the user reaches the display area 150B.

By controlling as described above, a user will not be radiated with light, even when the user reaches the display area 150B. A user can watch display information without visibility changing, even when display information is switched from the display area 150B to the display area 300B.

As described above, the display system of the present example embodiment is able to switch display information to be projected onto another display area, when a user enters a certain display area. Therefore, it is possible to provide a display system for displaying easily-seen display information on any display area even in a condition that communication with a host system is disabled.

Fourth Example Embodiment

Next, an interface device according to a fourth example embodiment of the present invention is described with reference to the drawings. An interface device in the present example embodiment is a device including the display system 3 in the third example embodiment, and is one example embodiment of a display system of the present invention.

Figure 25:
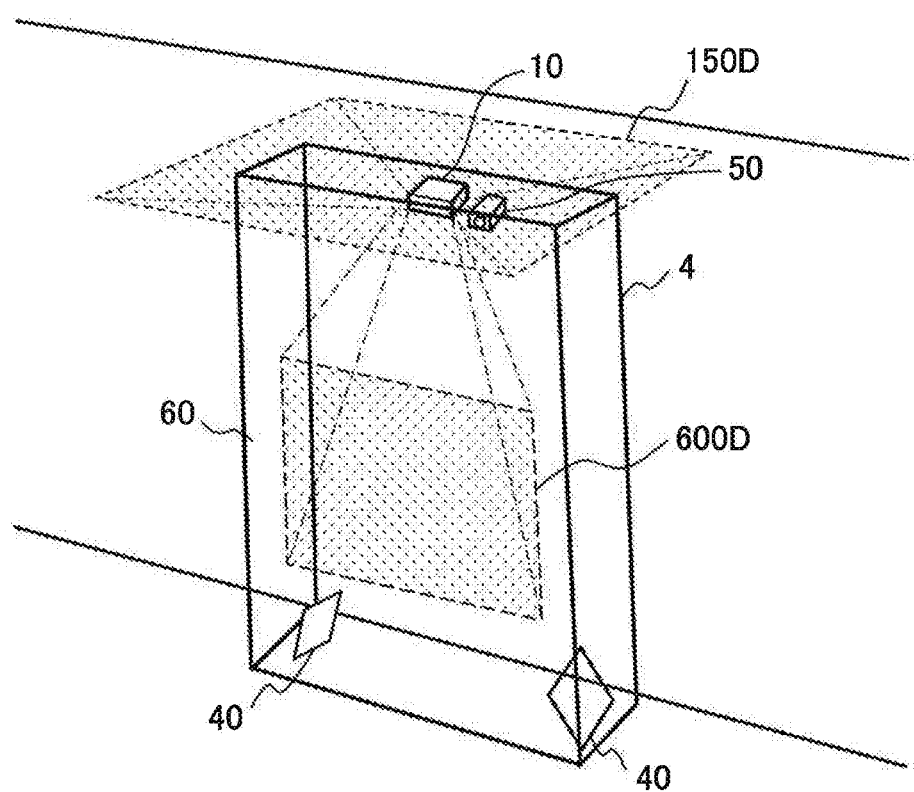
FIG. 25 is a conceptual diagram of a display system according to a fourth example embodiment of the present invention.
Figure 26:
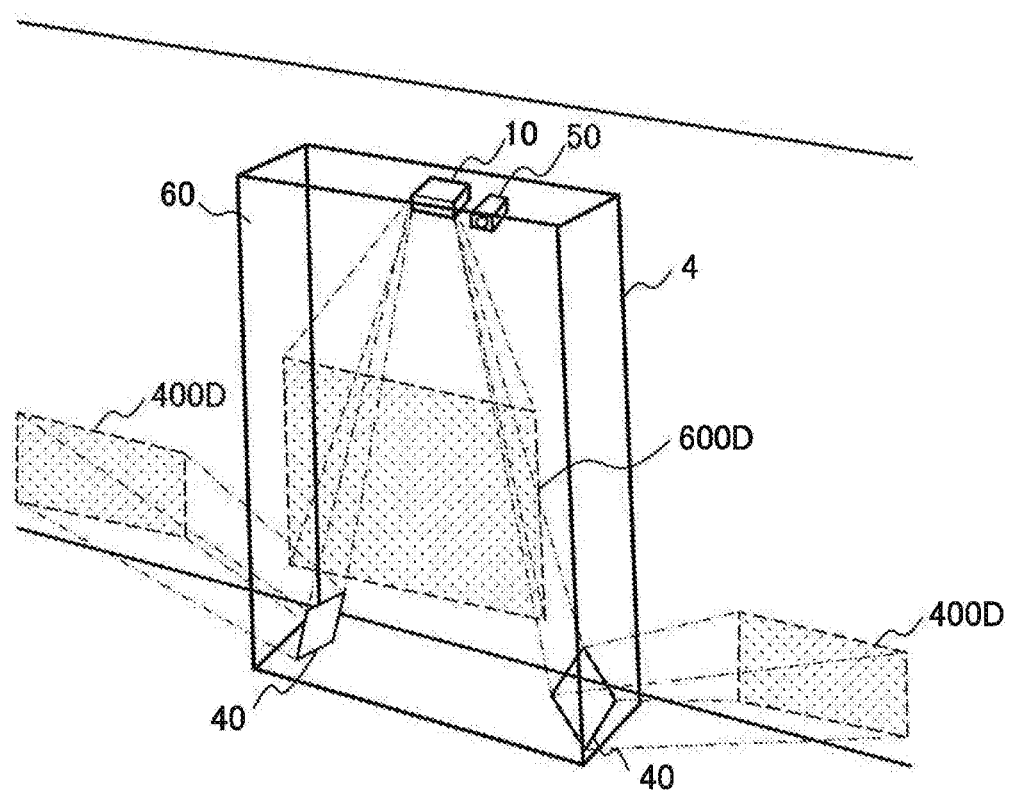
FIG. 26 is a conceptual diagram of another state of the display system according to the fourth example embodiment of the present invention.

FIG. 25 is a conceptual diagram of an interface device 4 in the present example embodiment. FIG. 26 is a conceptual diagram of another state of the interface device 4 in the present example embodiment.

As illustrated in FIG. 25, a projection device 10 and an imaging device 50 are set above the interface device 4. A control device 20 (not illustrated) is set inside the interface device 4, and a projection direction changing mirror 40 is set below the interface device 4. The projection device 10, the control device 20, the projection direction changing mirror 40, and the imaging device 50 of the interface device 4 have a configuration/function similar to those described in the first to third example embodiments. Further, the interface device 4 may be connected to an external server or the like by an unillustrated communication function.

An outer side of the interface device 4 is covered by a housing. At least a part of a front surface (hereinafter, an operation surface 60) of the housing of the interface device 4 is transparent, and functions as a rear-type screen. Further, a lower portion of a lateral surface of the interface device 4 is transparent or opened. Likewise, at least a part of an upper surface of the housing of the interface device 4 is transparent or opened for projecting display information onto a ceiling.

A user interface is displayed, by projected light from the projection device 10, as display information in an operation area 600D included in the operation surface 60 of the interface device 4. In the operation area 600D, projected light projected from a rear side is diffused and displayed. Note that, the example of FIG. 25 illustrates that projected light is projected from the projection device 10 onto the operation area 600D. Alternatively, the operation area 600D may be constituted of a transparent touch panel display.

The projection device 10 projects projected light onto a display area 150D of a ceiling. The display area 150D corresponds to a first display area.

FIG. 26 illustrates a state that an area to be projected with projected light is switched to a display area 400D. The display area 400D corresponds to a second display area. In the example of FIG. 26, a reflection surface of the projection direction changing mirror 40 is disposed in such a way that projected light to be projected from the projection device 10 is reflected toward the display area 400D. Projected light projected from the projection device 10 is guided to the reflection surface of the projection direction changing mirror 40, after a light path is switched by an unillustrated light path switching means. The projected light guided to the reflection surface of the projection direction changing mirror 40 is reflected on the reflection surface of the projection direction changing mirror 40, and display information is displayed on the display area 400D.

Figure 27:
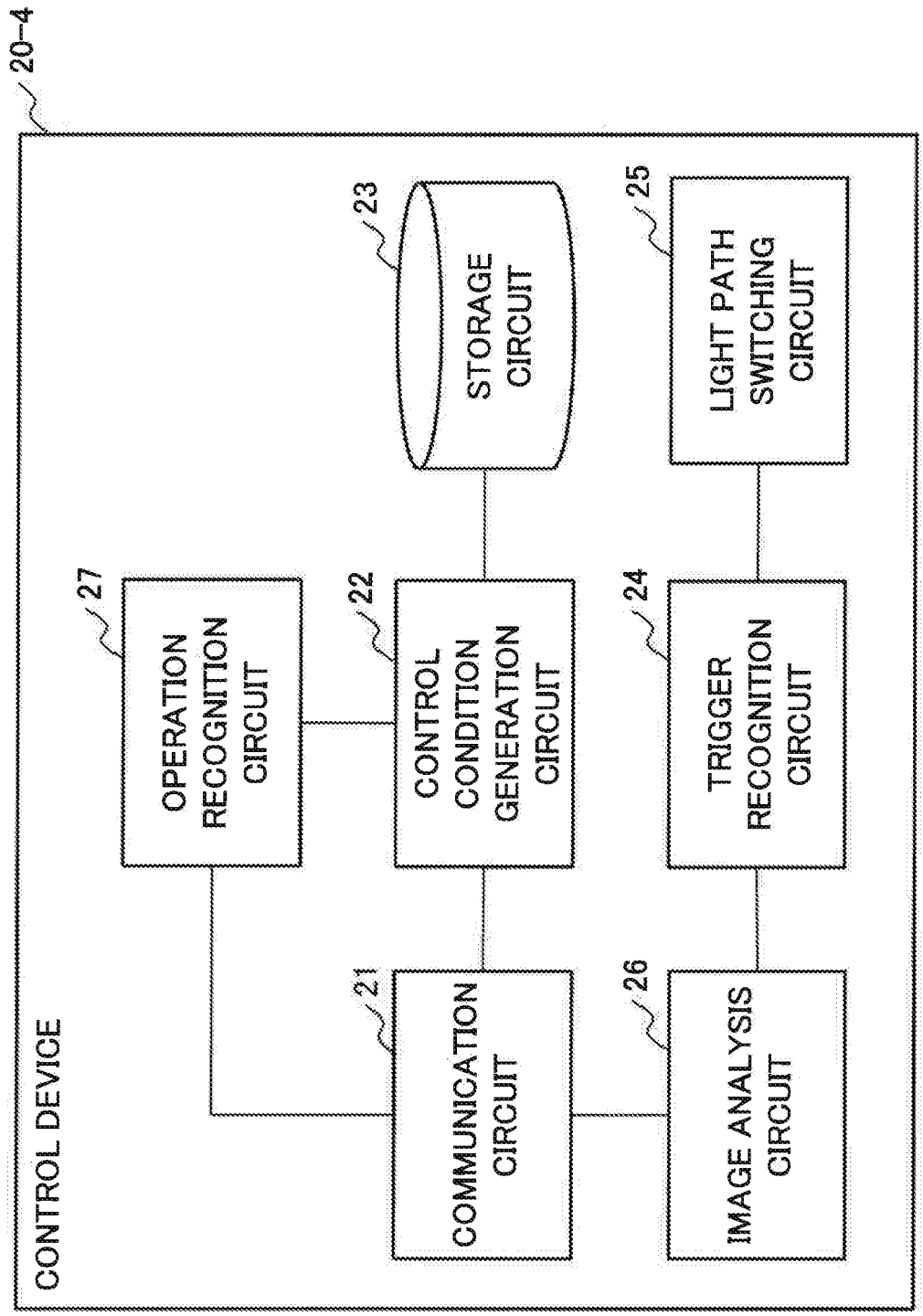
FIG. 27 is a block diagram illustrating a configuration of a control device of the display system according to the fourth example embodiment of the present invention.

FIG. 27 is a block diagram illustrating a configuration of a control device 20-4 in the present example embodiment. The control device 20-4 in the present example embodiment has a configuration in which an operation recognition circuit 27 is added to the control device 20-3 in the third example embodiment.

The operation recognition circuit 27 acquires image information from a communication circuit 21, and recognizes an operation content by a user by analyzing the acquired image information. Then, the operation recognition circuit 27 selects an action associated with the operation content, and outputs, to a control condition generation circuit 22, a display condition of display information associated with the action.

The control condition generation circuit 22 selects an associated pattern from a storage circuit 23 in accordance with a display condition of the operation recognition circuit 27, and outputs the selected pattern to a modulator element control circuit 14 of the projection device 10.

The modulator element control circuit 14 controls a spatial light modulator element 13, based on an input pattern, and changes display information to be displayed in the operation area 600D, the display area 150D, or the display area 400D from the spatial light modulator element 13.

For example, the operation recognition circuit 27 determines an operation position designated on the operation area 600D by a user at a certain point of time, and generates operation position information in which the point of time is associated with the determined operation position. Specifically, the operation recognition circuit 27 analyzes image information captured by the imaging device 50, and determines an operation position designated by a user in the operation area 600D. Then, the operation recognition circuit 27 generates operation position information in which the point of time when the user designates the operation position, and the operation position are associated. For example, setting an orthogonal coordinate system in the operation area 600D allows for the operation recognition circuit 27 to convert a determined operation position into coordinates of the orthogonal coordinate system.

An action associated with an operation on an interface displayed in the operation area 600D may be stored in the storage circuit 23 in the form of a table. For example, an identification (ID) of an interface, an operation position on the interface, and an action associated with the operation position may be stored in the storage circuit 23 in the form of a table. Processing of determining an operation position on an interface corresponds to determining an operation content performed with respect to the interface. Further, processing of selecting an action associated with an operation position on an interface corresponds to reacting from a device side with respect to an operation content performed with respect to an interface. For example, it may be sufficient that displaying specific display information in the operation area 600D with respect to a certain operation content is selected as an action.

Herein, the foregoing description is summarized. The interface device 4 includes the transparent operation surface 60 on which display information acquired by diffusing projected light is displayed. The projection device 10 displays, in the operation area 600D of the operation surface 60, a user interface by projecting projected light onto the operation surface 60. The imaging device 50 captures the operation area 600D where a user interface is displayed. The control device 20-4 recognizes an operation content with respect to a user interface by associating an operation content with respect to a user interface captured by the imaging device 50, and an operation key set in the user interface. The control device 20-4 controls the projection device 10 in such a way that display information according to an operation content is displayed on one of display areas.

In this way, the interface device 4 enables an interactive operation by displaying associated display information in response to an operation content of a user.

Figure 28:
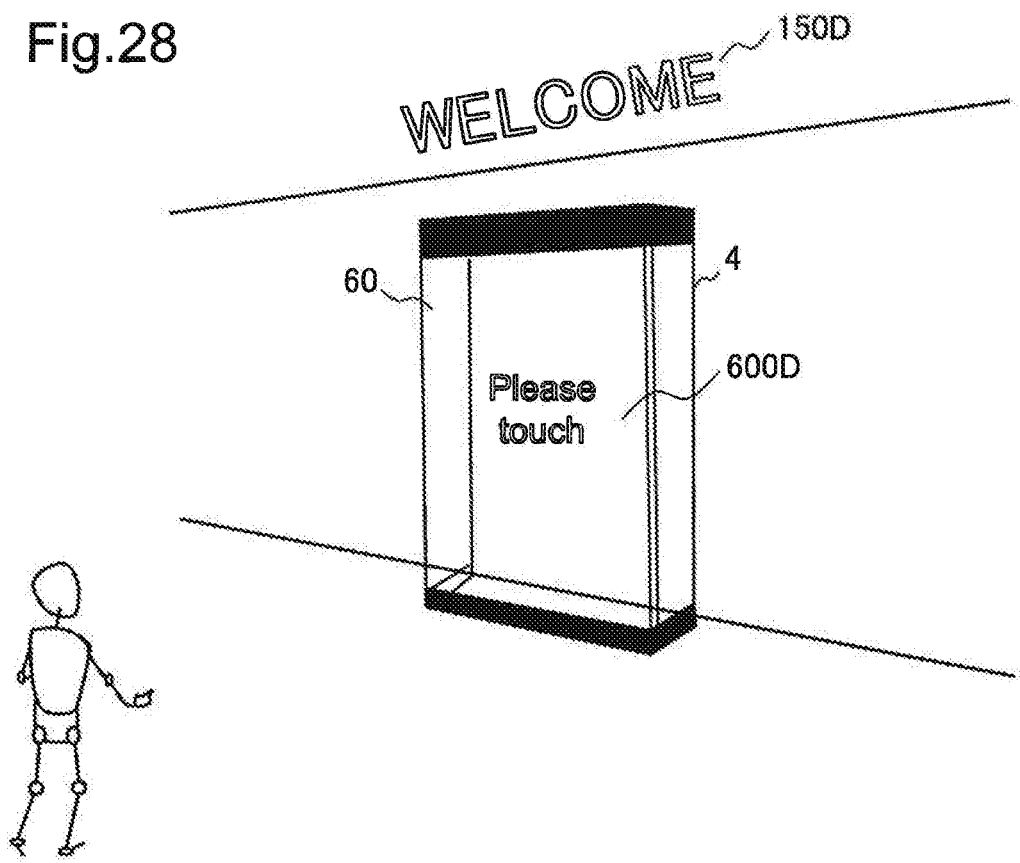
FIG. 28 is a block diagram illustrating a configuration of a control device of the display system according to the fourth example embodiment of the present invention.
Figure 29:
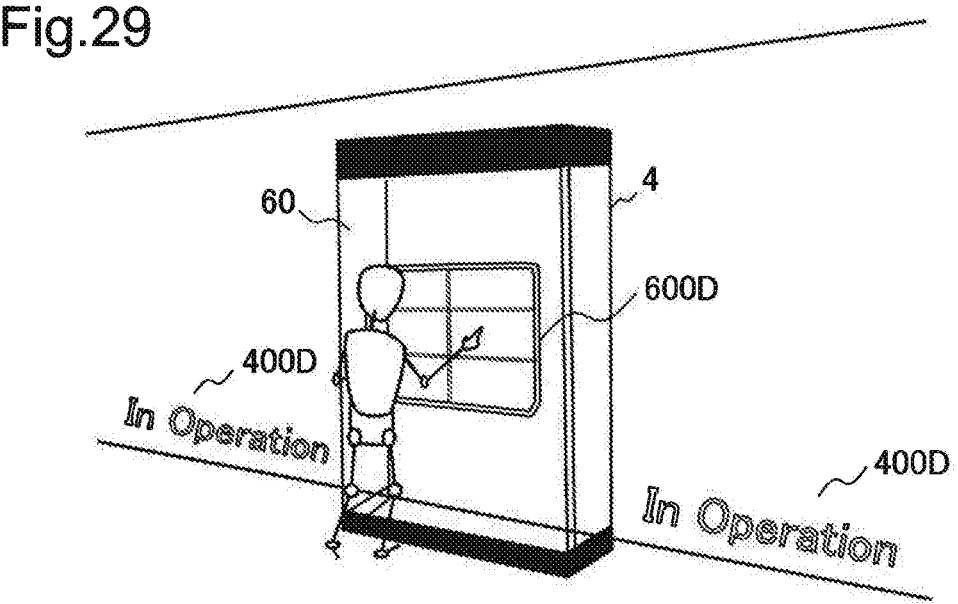
FIG. 29 is a conceptual diagram illustrating an application example of the display system according to the fourth example embodiment of the present invention.
Figure 30:
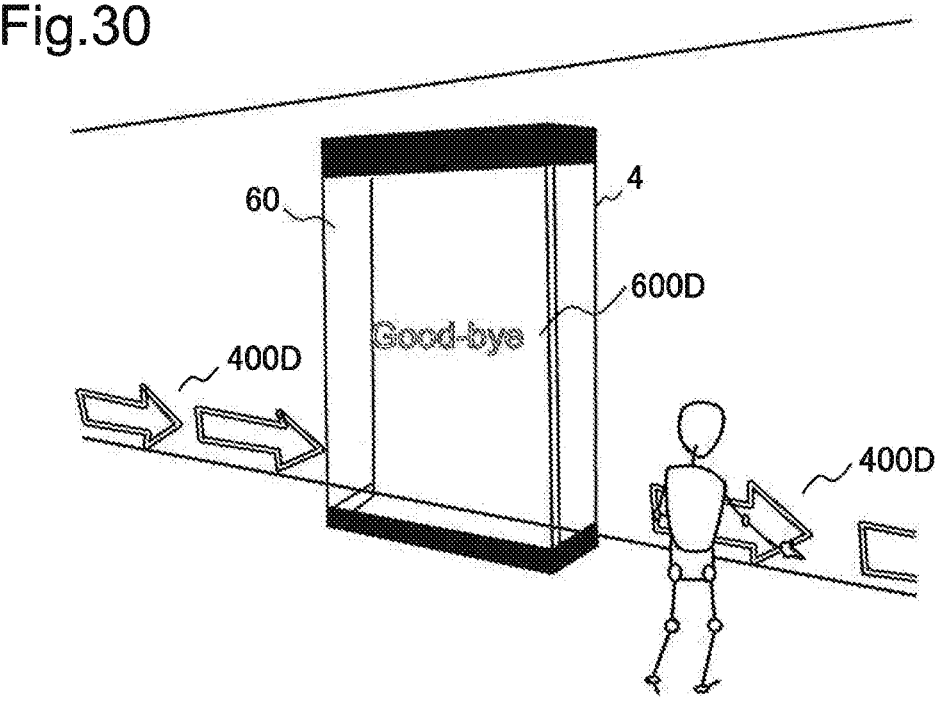
FIG. 30 is a conceptual diagram illustrating an application example of the display system according to the fourth example embodiment of the present invention.

Herein, an application example of the interface device 4 in the present example embodiment is described using FIGS. 28 to 30. FIGS. 28 to 30 illustrate an example in which a user using the interface device 4 is guided to the interface device 4 (FIG. 28), operates the interface device 4 (FIG. 29), and is guided in accordance with display information indicated by the interface device 4 (FIG. 30).

In FIG. 28, the interface device 4 displays display information "WELCOME" on the display area 150D (corresponding to a first display area) of a ceiling. Further, the interface device 4 displays display information "Please touch" in the operation area 600D of the operation surface 60. In the example of FIG. 28, a user is guided to the interface device 4, while being guided by information "WELCOME" displayed on the display area 150D.

The interface device 4 switches a projection direction of projected light in response to a position and an operation of a user. For example, the interface device 4 is set in such a way as to switch a projection direction, when a user enters a position where the user can see the operation area 600D, when the user waves his/her hand toward the interface device 4, or when the user touches the operation area 600D.

FIG. 29 is a conceptual diagram illustrating a state that a user is operating the interface device 4. The interface device 4 displays a specific interface screen during a period when a user is operating. For example, in a hotel, the interface device 4 may display, in the operation area 600D, an interface screen relating to a room, a restaurant, a shop, a spa, a play facility, a sightseeing spot nearby, and the like.

At this occasion, since it is not necessary to display display information on the display area 150D of a ceiling, the interface device 4 may switch a projection direction of projected light to a display area 400D (corresponding to a second display area). In FIG. 29, the interface device 4 displays, on the display area 400D, display information "In Operation". When a user acquires information by operating the interface device 4, the user may act based on the acquired information. For example, FIG. 29 assumes that a user is searching for a room where the user would like to stay or a facility that the user would like to use.

The interface device 4 is able to recognize an operation content of a user by analyzing imaging data of the imaging device 50 or motion of the user by a touch panel function of the operation surface 60. For example, the interface device 4 recognizes an operation content of a user by associating a content being projected at a certain position on the operation area 600D, and an operation position and motion of a user.

FIG. 30 is a conceptual diagram illustrating a state that a user who finishes using the interface device 4 is moving to a destination, while being guided by display information (arrow) displayed on the display area 400D. In FIG. 30, the interface device 4 displays, in the operation area 600D, display information "Good-bye". When a user leaves, the interface device 4 may switch a projection direction of display information, as illustrated in FIG. 28.

In the application example of FIGS. 28 to 30, a switching timing of a projection direction of light may differ from the above-described description.

For example, display information may not be displayed on the operation surface 60 in the condition of FIG. 28, and display information may be displayed on the operation surface in accordance with the condition of FIG. 29. Further, in a condition in which a user is approaching the interface device 4, display information may be displayed on a display area in front of the interface device 4, and display information may be switched to the operation area 600D synchronously with a timing when the user enters the display area. Further, display information may not be displayed on the display area 150D of a ceiling, and an area where display information is displayed may be switched between the operation area 600D and the display area 400D.

Figure 31:
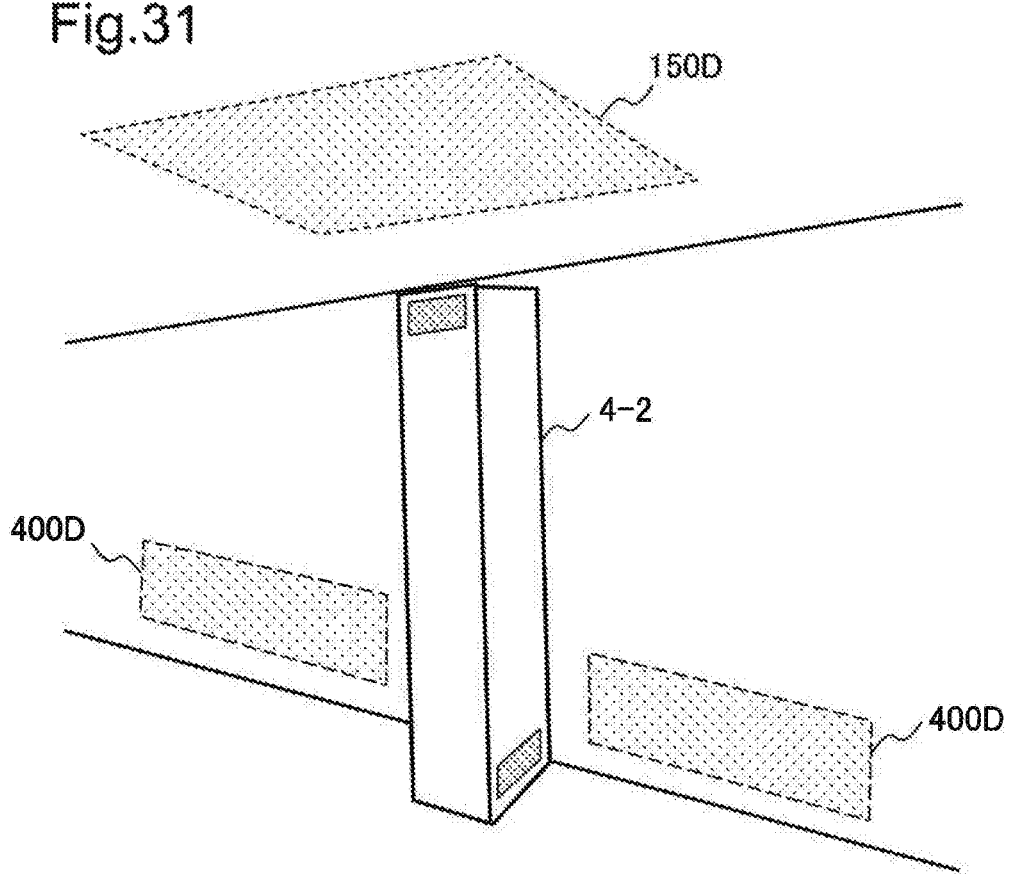
FIG. 31 is a conceptual diagram illustrating an application example of the display system according to the fourth example embodiment of the present invention.

FIG. 31 is an example (interface device 4-2) in which a width of the interface device 4 is narrowed. The interface device 4-2 in FIG. 31 is a configuration example having a function of switching between projection onto a ceiling, and projection onto a foot end wall, without forming an operation area 600D. Note that, since an internal configuration of the interface device 4-2 in FIG. 31 is similar to the interface device 4 except that projected light is not projected onto the operation area 600D, detailed description of the interface device 4-2 is omitted. Since the interface device 4-2 in FIG. 31 does not include a conspicuous configuration like the operation area 600D, and a width of the interface device 4-2 is narrow, it is possible to implement a less noticeable appearance as compared with the interface device 4 in FIGS. 28 to 30.

As described above, the interface device of the present example embodiment is able to switch a direction of projecting display information depending on a user's condition. Therefore, the interface device of the present example embodiment is able to display easily-seen display information on a desired display area. Further, the interface device of the present example embodiment enables an interactive operation by a user.

Fifth Example Embodiment

Next, a display system according to a fifth example embodiment of the present invention is described with reference to the drawings. A display system in the present example embodiment includes a mechanism for removing zero-order light included in modulated light 130 in the first to fourth example embodiments.

Figure 32:
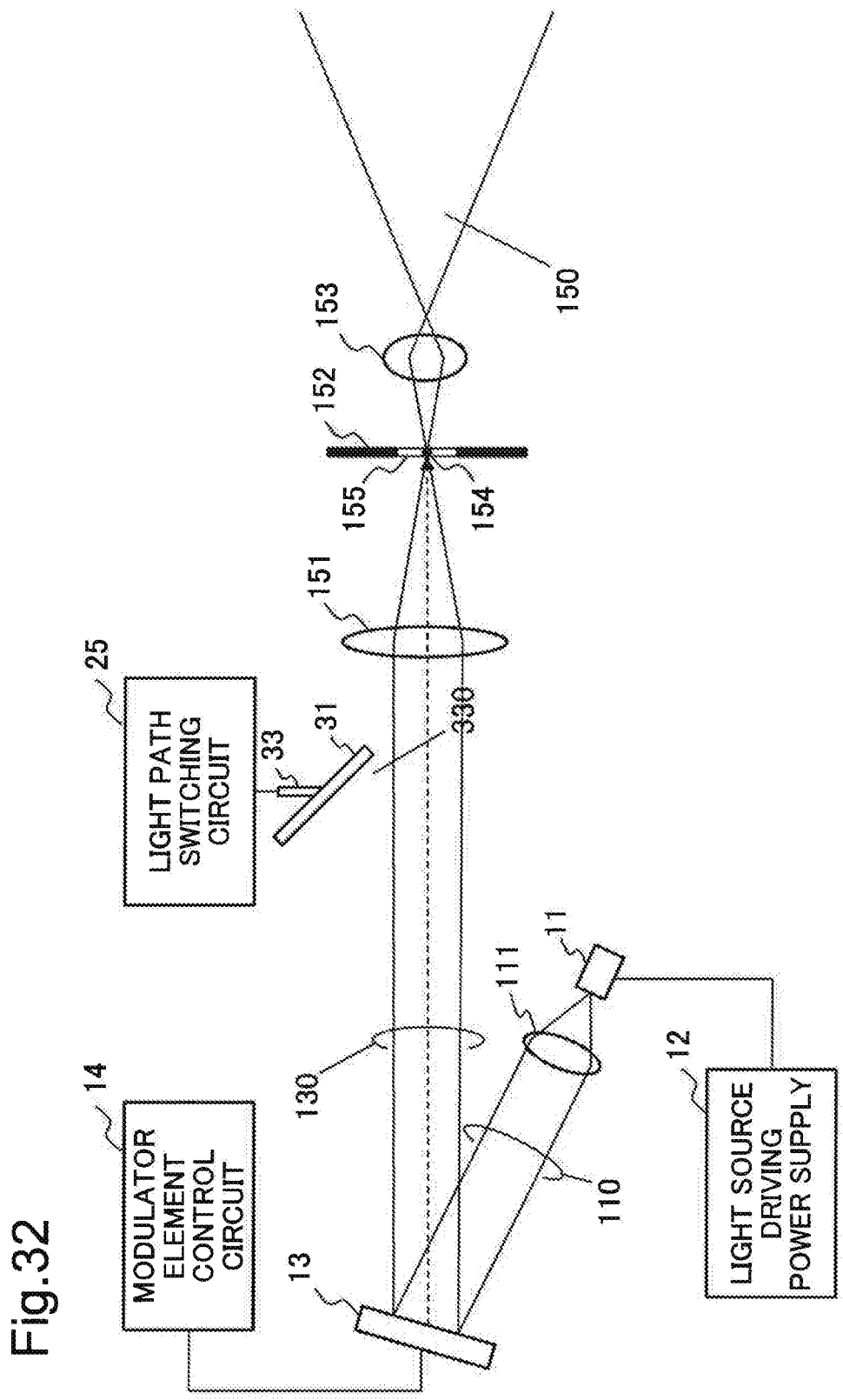
FIG. 32 is a conceptual diagram illustrating a configuration example of a display system according to a fifth example embodiment of the present invention.

FIG. 32 is an example in which a mechanism for removing zero-order light is added in the example of FIG. 7. The example of FIG. 32 is an example in which a light absorbing material 154 (also referred to as a light absorbing member) for absorbing zero-order light is disposed on a light path of zero-order light. In FIG. 32, a transparent window member 155 is disposed in an opening portion of an aperture 152, and the light absorbing material 154 is disposed on an outer surface or inside the window member 155. Configuring as illustrated in FIG. 32 enables to remove zero-order light by the light absorbing material 154.

Figure 33:
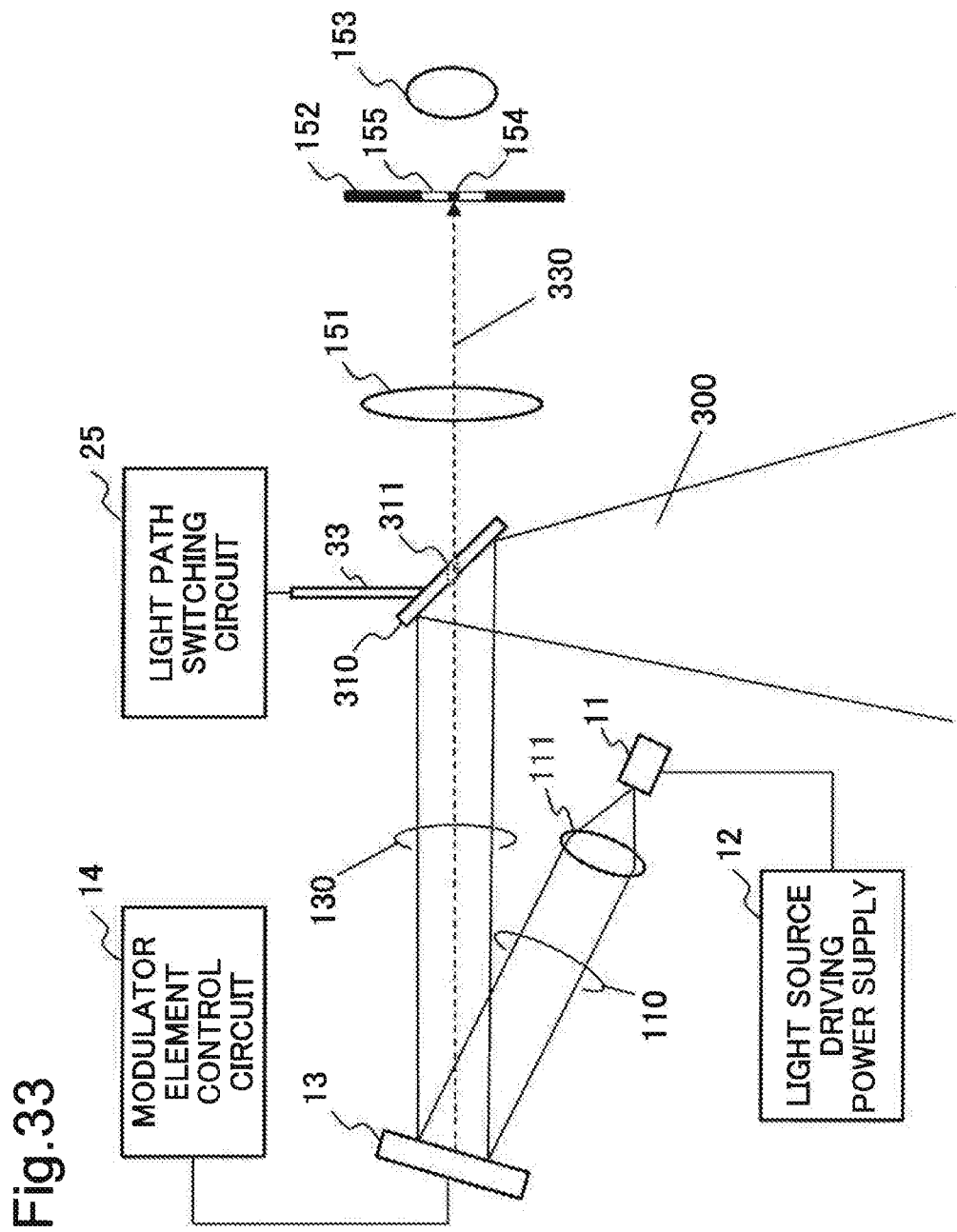
FIG. 33 is a conceptual diagram illustrating another configuration example of the display system according to the fifth example embodiment of the present invention.

FIG. 33 is an example in which a mechanism for removing zero-order light 330 is added to the example of FIG. 8. The example of FIG. 33 is a configuration example in which the light absorbing material 154 for absorbing zero-order light 330 is disposed on a light path of the zero-order light 330, and a reflecting mirror 310 including an opening portion 311 (also referred to as a through-hole) is disposed on a light path of the zero-order light 330. FIG. 33 is an example in which the reflecting mirror 310 is located on a light path of modulated light 130. In the example of FIG. 33, zero-order light 330 passes through the opening portion 311, and is absorbed by the light absorbing material 154. Therefore, zero-order light 330 will be removed from projected light 300.

Figure 34:
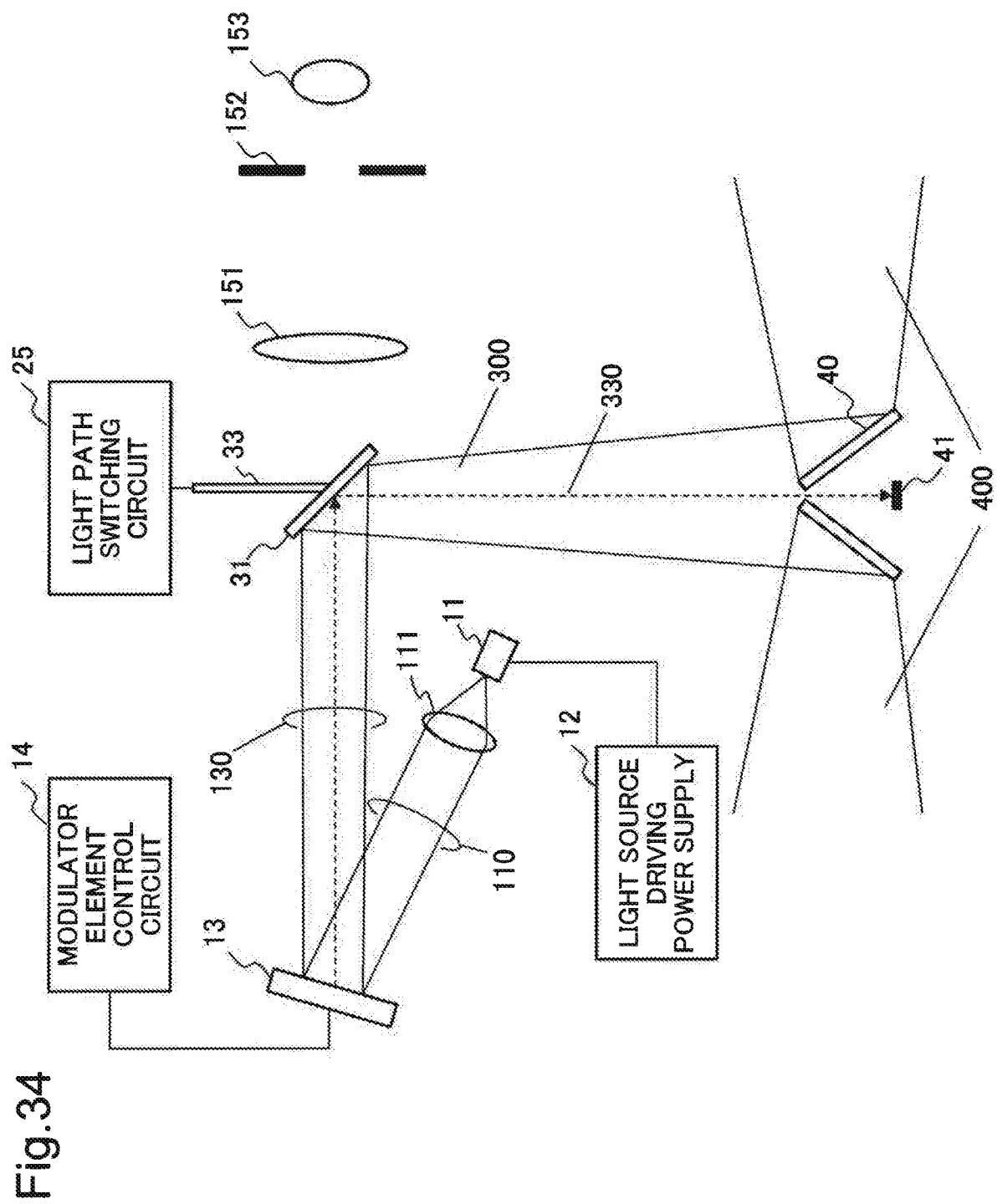
FIG. 34 is a conceptual diagram illustrating still another configuration example of the display system according to the fifth example embodiment of the present invention.

FIG. 34 is an example in which a mechanism for removing zero-order light 330 is added in the example of FIG. 16. The example of FIG. 34 is a configuration in which a gap is formed in a part of a projection direction changing mirror 40, and zero-order light 330 is allowed to pass through the gap. The configuration of FIG. 34 is an example in which zero-order light 330 passes through a gap of the projection direction changing mirror 40, and is absorbed by a light absorbing member 41.

As described above, the display system according to the present example embodiment enables to remove zero-order light which may be included in projected light. Note that the above-described configurations of FIGS. 32 to 34 may be combined as necessary.

(Use Scene)

Herein, a use scene of display systems according to the first to fifth example embodiments of the present invention is described by employing the interface device 4-2 in FIG. 31, as an example.

Figure 35:
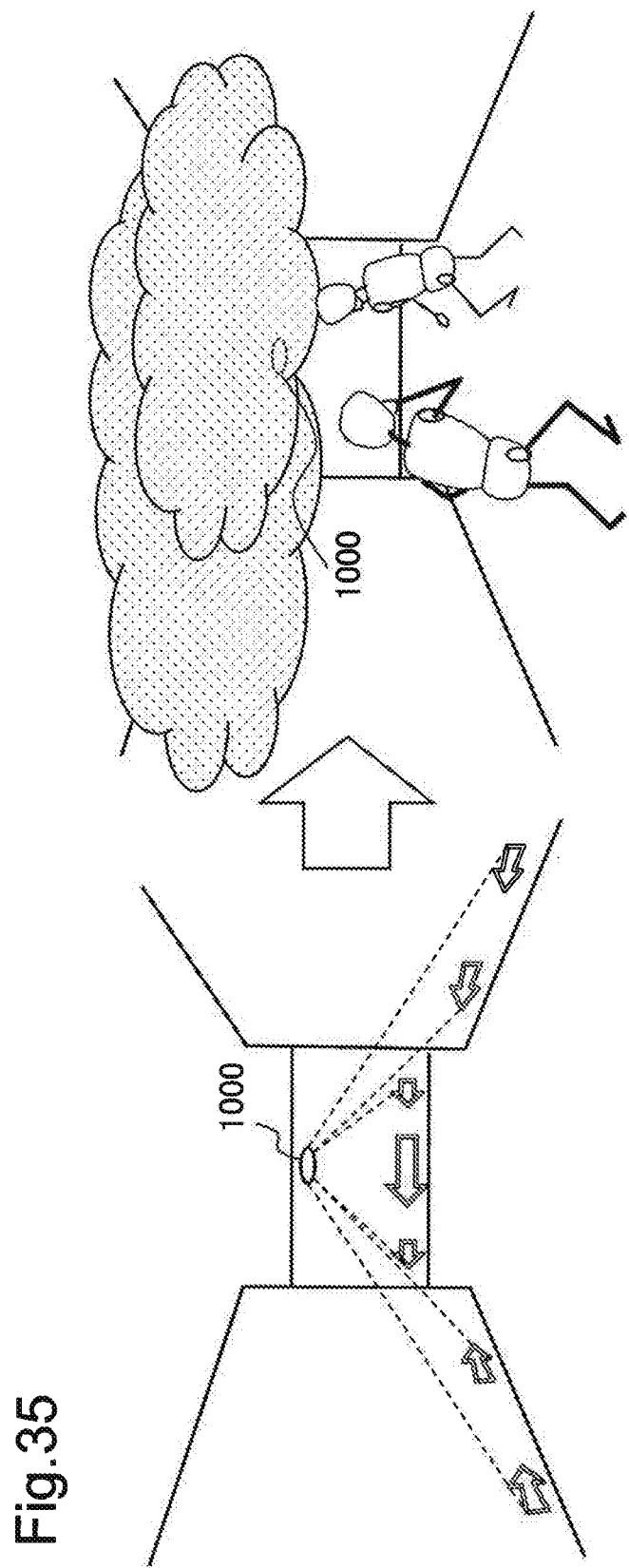
FIG. 35 is a conceptual diagram relating to projection employing a general projector.

FIG. 35 is an example in which display information is projected onto a wall surface by a projector 1000 installed within a building such as hotel. A portion on a left side of the arrow illustrates an example in which display information is projected onto a foot end in a normal condition. A user of a hotel and the like recognizes display information displayed on a wall surface, and easily reaches a destination.

A portion on a right side of the arrow illustrates a state that display information cannot be displayed on a desired wall surface from the projector 1000, when a fire breaks out. When a fire breaks out, display information for guiding a user to evacuate outdoors is desired to be displayed on a wall surface. However, when the projector 1000 is employed, it is not possible to display display information at a desired position due to smoke.

FIG. 36 is an example in which the interface device 4-2 in FIG. 31 is employed. Employing the interface device 4-2 enables to display display information on the display area 150D of a ceiling in a normal condition (left side), and switch to display display information on the display area 400D at a foot end in an emergency situation such as a fire (right side). In this way, in a method of example embodiments of the present invention, even in a condition that smoke is generated indoors by a fire, it is possible to guide a user to an appropriate destination.

In the foregoing, the present invention is described by using the above-described example embodiments as an exemplary example. The present invention, however, is not limited to the above-described example embodiments. Specifically, the present invention is applicable to various aspects comprehensible to a person skilled in the art within the scope of the present invention.

A part or the entirety of the above-described example embodiments may be described as follows, but is not limited to the following configuration.

(Supplementary Note 1)

A display system including:

a projection device that switches and projects emitted light from a spatial light modulator element onto a plurality of display areas; and a control device that controls the projection device to switch a projection direction of projected light, based on a display condition of display information to be displayed on the plurality of display areas, wherein the projection device includes a reflecting mirror that is put in and out of a light path of emitted light from the spatial light modulator element, and a light path switching means that switches a projection direction of projected light by putting the reflecting mirror in and out of a light path of emitted light from the spatial light modulator element in response to control of the control device.

(Supplementary Note 2)

The display system according to supplementary note 1, wherein the projection device includes a light source that emits light toward a display part of the spatial light modulator element, and a projection optical system that projects emitted light from the spatial light modulator element toward a first display area, and the reflecting mirror reflects emitted light from the spatial light modulator element toward a second display area, when the reflecting mirror is put in a light path of emitted light from the spatial light modulator element.

(Supplementary Note 3)

The display system according to supplementary note 2, wherein the light path switching means includes a movable part that deforms in response to control of the control device, and the reflecting mirror is connected to the movable part, and is put in and out of a light path of emitted light from the spatial light modulator element, accompanied by deformation of the movable part.

(Supplementary Note 4)

The display system according to supplementary note 3, wherein the movable part is an expanding/contracting member that expands and contracts in response to control of the control device, and the reflecting mirror is connected to one end of the expanding/contracting member, and is put in and out of a light path of emitted light from the spatial light modulator element, accompanied by an expanding/contracting operation of the expanding/contracting member.

(Supplementary Note 5)

The display system according to supplementary note 3, wherein the movable part is a rotating member that is rotated in response to control of the control means, and the reflecting mirror is connected to the rotating member, and is put in and out of a light path of emitted light from the spatial light modulator element, accompanied by a rotating operation of the rotating member.

(Supplementary Note 6)

The display system according to any one of supplementary notes 2 to 5, wherein the reflecting mirror is put in and out between the spatial light modulator element and the projection optical system.

(Supplementary Note 7)

The display system according to any one of supplementary notes 2 to 5, wherein the projection optical system includes a Fourier transform lens that collects emitted light from the spatial light modulator element, an aperture disposed at a post stage of the Fourier transform lens, and configured to block a part of light included in light collected by the Fourier transform lens, and a projection lens disposed at a post stage of the aperture, and configured to enlarge and project light that passes through the aperture, and the reflecting mirror is put in and out between the spatial light modulator element and the Fourier transform lens.

(Supplementary Note 8)

The display system according to any one of supplementary notes 1 to 7, wherein the control device includes a communication circuit that receives, from a host system, a switching signal for switching a display area where projected light is projected, and the control device controls the light path switching means in response to the switching signal.

(Supplementary Note 9)

The display system according to any one of supplementary notes 1 to 8, wherein the spatial light modulator element is of a phase modulation type.

(Supplementary Note 10)

The display system according to any one of supplementary notes 2 to 9, further including a projection direction changing mirror disposed on a light path of light reflected by the reflecting mirror, and configured to reflect light reflected by the reflecting mirror toward a third display area.

(Supplementary Note 11)

The display system according to any one of supplementary notes 1 to 10, further including an imaging device that captures a region including at least one of display areas.

(Supplementary Note 12)

The display system according to supplementary note 11, wherein the control device analyzes imaging data captured by the imaging device, and when a detection target is detected in a display area where display information is being displayed, the control device controls the light path switching means in such a way as to switch a projection direction of projected light.

(Supplementary Note 13)

The display system according to supplementary note 11 or 12, further including a transparent operation surface on which projected light projected from the projection device is diffused and displayed, wherein the projection device displays a user interface by projecting projected light onto an operation area of the operation surface, the imaging device captures an operation area where the user interface is displayed, and the control device recognizes an operation content with respect to the user interface by associating an operation position with respect to the user interface captured by the imaging device, with an operation key set on the user interface, and controls the projection device in such a way as to display display information according to the operation content on one of the display areas.

(Supplementary Note 14)

The display system according to any one of supplementary notes 1 to 13, wherein a light absorbing member is disposed on a light path of zero-order light included in emitted light from the spatial light modulator unit.

(Supplementary Note 15)

The display system according to supplementary note 14, wherein a through-hole is formed in the reflecting mirror on a light path of zero-order light included in emitted light from the spatial light modulator element.

(Supplementary Note 16)

The display system according to supplementary note 10, wherein a through hole is formed in the projection direction changing mirror on a light path of zero-order light included in emitted light from the spatial light modulator element reflected by the reflecting mirror.

REFERENCE SIGNS LIST 1, 3 Display system
4 Interface device
10 Projection device
11 Light source
12 Light source driving power supply
13 Spatial light modulator element
14 Modulator element control circuit
15 Projection optical system
20 Control device
21 Communication circuit
22 Control condition generation circuit
23 Storage circuit
24 Trigger recognition circuit
25 Light path switching circuit
26 Image analysis circuit
27 Operation recognition circuit
30 Light path switching means
31 Reflecting mirror
33 Movable part
40 Projection direction changing mirror
50 Imaging device
51 Imaging element
53 Image processing processor
55 Internal memory
57 Output circuit

The invention claimed is:

1. A display system comprising:
a projector configured to switch and project emitted light from a spatial light modulator element onto a plurality of display areas; and
a controller configured to control the projector to switch a projection direction of projected light, using a display condition of display information to be displayed on the plurality of display areas,
wherein the projector comprises:
 a reflecting mirror configured to be put in and out of a light path of emitted light from the spatial light modulator element;
 a light path switcher configured to switch a projection direction of projected light by putting the reflecting mirror in and out of a light path of emitted light from the spatial light modulator element in response to control of the controller; and
 a projection optical system configured to project emitted light from the spatial light modulator element toward a first display area,
wherein the projection optical system comprises:
 a Fourier transform lens configured to collect emitted light from the spatial light modulator element;
 an aperture disposed at a post stage of the Fourier transform lens, and configured to block a part of light included in light collected by the Fourier transform lens; and
 a projection lens disposed at a post stage of the aperture, and configured to enlarge and project light that passes through the aperture,
wherein the reflecting mirror is configured to be put in and out between the spatial light modulator element and the Fourier transform lens, and
wherein the reflecting mirror is configured to reflect emitted light from the spatial light modulator element toward a second display area, if the reflecting mirror is put in a light path of emitted light from the spatial light modulator element.

2. The display system according to claim 1, wherein the projector comprises:
a light source configured to emit light toward a display part of the spatial light modulator element.

3. The display system according to claim 2, wherein the light path switcher includes a movable part configured to deform in response to control of the controller, and
wherein the reflecting mirror is connected to the movable part, and is configured to be put in and out of a light path of emitted light from the spatial light modulator element, accompanied by deformation of the movable part.

4. The display system according to claim 3, wherein the movable part is an expanding/contracting member that expands and contracts in response to control of the controller, and
wherein the reflecting mirror is connected to one end of the expanding/contracting member, and is configured to be put in and out of a light path of emitted light from the spatial light modulator element, accompanied by an expanding/contracting operation of the expanding/contracting member.

5. The display system according to claim 3, wherein the movable part is a rotating member that is configured to be rotated in response to control of the controller, and
wherein the reflecting mirror is connected to the rotating member, and is configured to be put in and out of a light path of emitted light from the spatial light modulator element, accompanied by a rotating operation of the rotating member.

6. The display system according to claim 2, wherein the reflecting mirror is configured to be put in and out between the spatial light modulator element and the projection optical system.

7. The display system according to claim 1, wherein the controller includes a communication circuit configured to receive, from a host system, a switching signal for switching a display area where projected light is projected, and
wherein the controller is configured to control the light path switcher in response to the switching signal.

8. The display system according to claim 1, wherein the spatial light modulator element is of a phase modulation type.

9. The display system according to claim 2, further comprising a projection direction changing mirror disposed on a light path of light reflected by the reflecting mirror, and configured to reflect light reflected by the reflecting mirror, toward a third display area.

10. A display system comprising:
a projector configured to switch and project emitted light from a spatial light modulator element onto a plurality of display areas;
a controller configured to control the projector to switch a projection direction of projected light, using a display condition of display information to be displayed on the plurality of display areas; and
a camera that captures a region including at least one of display areas,
wherein the projector comprises:
 a reflecting mirror configured to be put in and out of a light path of emitted light from the spatial light modulator element; and
 a light path switcher configured to switch a projection direction of projected light by putting the reflecting mirror in and out of a light path of emitted light from the spatial light modulator element in response to control of the controller, wherein the controller is configured to analyze imaging data captured by the camera, and wherein the controller is configured to, if a detection target is detected in a display area where display information is being displayed, control the light path switcher in such a way as to switch a projection direction of projected light.

11. The display system according to claim 10, further comprising:

a transparent operation surface configured such that projected light projected from the projector is diffused and displayed on the transparent operation surface, wherein the projector is configured to display a user interface by projecting projected light onto an operation area of the operation surface, wherein the camera is configured to capture an operation area where the user interface is displayed, and wherein the controller is configured to recognize an operation content with respect to the user interface by associating an operation position with respect to the user interface captured by the camera, with an operation key set on the user interface, and controls the projector in such a way as to display display information according to the operation content on one of the display areas.

12. A display system comprising:

a projector configured to switch and project emitted light from a spatial light modulator element onto a plurality of display areas; and a controller configured to control the projector to switch a projection direction of projected light, using a display condition of display information to be displayed on the plurality of display areas, wherein the projector comprises:

a reflecting mirror configured to be put in and out of a light path of emitted light from the spatial light modulator element, and a light path switcher configured to switch a projection direction of projected light by putting the reflecting mirror in and out of a light path of emitted light from the spatial light modulator element in response to control of the controller, and wherein a light absorbing member is disposed on a light path of zero-order light included in emitted light from the spatial light modulator element.

13. The display system according to claim 12, wherein a through-hole is formed in the reflecting mirror on a light path of zero-order light included in emitted light from the spatial light modulator element.

14. The display system according to claim 9, wherein a through-hole is formed in the projection direction changing mirror on a light path of zero-order light included in emitted light from the spatial light modulator element reflected by the reflecting mirror.

* * * * *